United States Patent
Zinn et al.

(10) Patent No.: US 12,357,932 B2
(45) Date of Patent: Jul. 15, 2025

(54) AIR FILTRATION MEDIA HAVING METAL NANOPARTICLE AGGLOMERATES ADHERED THERETO, FORMATION THEREOF AND USE THEREOF

(71) Applicant: KUPRION INC., San Jose, CA (US)

(72) Inventors: Alfred A. Zinn, Palo Alto, CA (US); Randall M. Stoltenberg, Palo Alto, CA (US)

(73) Assignee: Kuprion Inc., Waterbury, CT (US)

(*) Notice: Subject to any disclaimer, the term of this patent is extended or adjusted under 35 U.S.C. 154(b) by 391 days.

(21) Appl. No.: 17/759,639

(22) PCT Filed: Feb. 4, 2021

(86) PCT No.: PCT/US2021/016519
§ 371 (c)(1),
(2) Date: Jul. 28, 2022

(87) PCT Pub. No.: WO2021/158726
PCT Pub. Date: Aug. 12, 2021

(65) Prior Publication Data
US 2023/0090532 A1     Mar. 23, 2023

Related U.S. Application Data

(60) Provisional application No. 63/013,732, filed on Apr. 22, 2020, provisional application No. 62/970,751, (Continued)

(51) Int. Cl.
*B01D 39/16*     (2006.01)
*A41D 13/11*     (2006.01)
(Continued)

(52) U.S. Cl.
CPC .......... *B01D 39/163* (2013.01); *A41D 13/11* (2013.01); *B01D 39/18* (2013.01); *A62B 23/025* (2013.01);
(Continued)

(58) Field of Classification Search
CPC ....................... B01D 39/18; B01D 2239/0258
See application file for complete search history.

(56) References Cited

U.S. PATENT DOCUMENTS

| 7,736,414 B1 | 6/2010 | Zinn |
| 8,105,414 B2 | 1/2012 | Zinn |

(Continued)

FOREIGN PATENT DOCUMENTS

| JP | 2003221304 A | 8/2003 |
| JP | 2009526828 A | 7/2009 |

(Continued)

OTHER PUBLICATIONS

International Search Report and Written Opinion for PCT/US2021/016519 dated Feb. 14, 2021.

*Primary Examiner* — Robert Clemente
(74) *Attorney, Agent, or Firm* — Carmody Torrance Sandak & Hennessey LLP

(57) ABSTRACT

Metal nanoparticle agglomerates may convey biocidal activity to surfaces upon which they are deposited and become adhered, such as various air filtration media. Air filtration media may comprise a plurality of fibers having a plurality of metal nanoparticle agglomerates adhered thereto. The metal nanoparticle agglomerates may comprise a plurality of fused, partially fused, or unfused metal nanoparticles that are associated with one another upon a surface of the plurality of the fibers. Suitable metal nanoparticles for promoting biocidal activity against various pathogens, such as viruses and bacteria, may include copper nanoparticles
(Continued)

Figure 1:
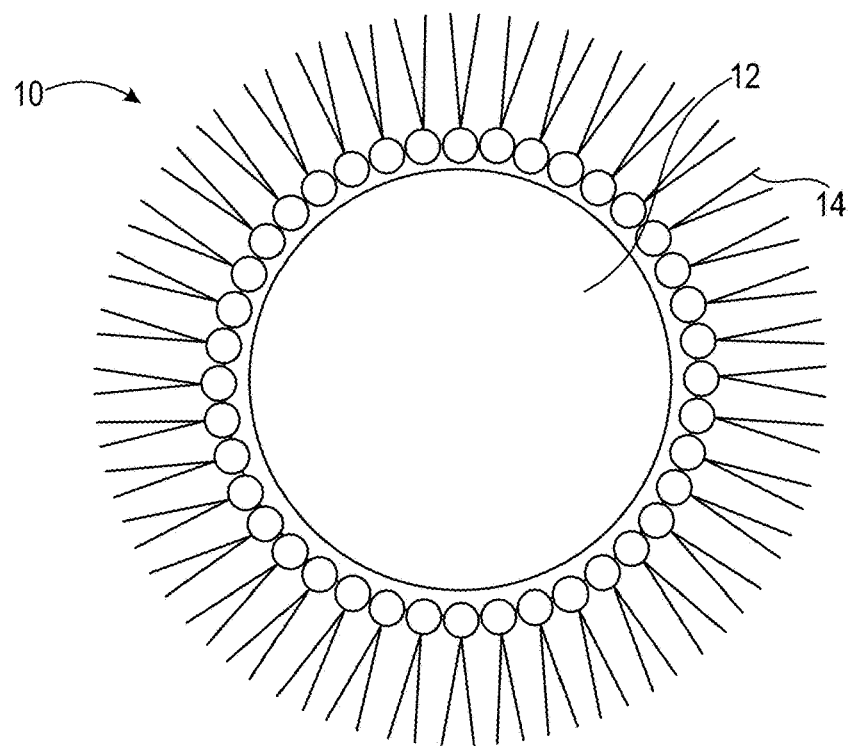

and/or silver nanoparticles. Masks, inline filters, and air filtration systems may incorporate the air filtration media.

16 Claims, 5 Drawing Sheets

Related U.S. Application Data filed on Feb. 6, 2020, provisional application No. 62/969,759, filed on Feb. 4, 2020.

(51) Int. Cl.
*A62B 23/02* (2006.01)
*B01D 39/18* (2006.01)

(52) U.S. Cl.
CPC ............... *B01D 2239/0258* (2013.01); *B01D 2239/0407* (2013.01); *B01D 2239/0442* (2013.01); *B01D 2239/0478* (2013.01); *B01D 2239/10* (2013.01); *B01D 2239/1241* (2013.01)

(56) References Cited

U.S. PATENT DOCUMENTS

| | | | |
|---|---|---|---|
| 8,192,866 | B2 | 6/2012 | Golightly et al. |
| 8,486,305 | B2 | 7/2013 | Zinn et al. |
| 8,834,747 | B2 | 9/2014 | Zinn |
| 9,005,483 | B2 | 4/2015 | Zinn et al. |
| 9,095,898 | B2 | 8/2015 | Zinn |
| 9,700,940 | B2 | 7/2017 | Zinn |
| 2010/0040655 | A1 | 2/2010 | Ren et al. |
| 2013/0096262 | A1* | 4/2013 | Sjong .................... C08B 37/003 525/461 |
| 2016/0201183 | A1 | 7/2016 | Zinn |
| 2018/0171093 | A1* | 6/2018 | Greiner ..................... B32B 5/18 |
| 2018/0243674 | A1* | 8/2018 | Gulrez ............... B01D 39/1623 |
| 2019/0224599 | A1 | 7/2019 | Shin |
| 2021/0129087 | A1* | 5/2021 | Zhao .................. B01D 53/8687 |

FOREIGN PATENT DOCUMENTS

| | | |
|---|---|---|
| KR | 101848494 B1 | 4/2018 |
| RU | 2693832 C1 | 7/2019 |
| WO | 2018009353 A1 | 1/2018 |

* cited by examiner

AIR FILTRATION MEDIA HAVING METAL NANOPARTICLE AGGLOMERATES ADHERED THERETO, FORMATION THEREOF AND USE THEREOF

BACKGROUND

The world is facing increasing threats from antibiotic-resistant strains of bacteria (i.e., "super bugs") that cannot be effectively treated due, at least in part, to the overuse of antibiotics. Other types of resistant microorganisms can present similar issues. Common influenza and emerging viruses, such as coronaviruses, also represent a significant health threat. Increased population densities and efficient mass transit infrastructure have further contributed significantly to localized and global spread of both common and emerging diseases.

Even common bacterial and viral infections may present serious health risks if effective infection controls are not practiced. More virulent pathogens, including the virus associated with the current coronavirus pandemic, threaten to overwhelm existing healthcare structure due to inadequate infection control.

Personal protective equipment (PPE), such as masks, may be employed as part of protocols for establishing infection control. Masks are often worn by infected and healthy individuals to limit the spread of disease, particularly in crowded locales where there is an increased risk of person-to-person disease transmittal, particularly when effective social distancing is not feasible. In a healthcare setting, the use of masks and additional personal protective equipment may be even more critical. The effectiveness of masks for decreasing the incidence of infections is sometimes limited, however. Masks and similar personal protective equipment are often characterized by their 'N' rating. N100-rated masks, for example, can filter out particulates down to about 0.3 microns in size. The influenza virus is smaller than this limit (~0.14 microns), but viral transport often takes place via larger respiratory droplets (e.g., about 5 microns or larger in size) generated from coughing or sneezing, meaning that they can be effectively filtered by an N100-rated mask, unless the respiratory droplets break up upon contact. In addition, respiratory droplets may evaporate quickly (i.e., within several seconds) upon ejection from an individual, thereby leaving free viruses airborne. Masks with a lower filtration efficiency, such as N95-rated masks, allow up to 5% of even these larger size particulates to pass through. Even in the case of an N100-rated mask, sealing around the mouth and nose areas is often insufficient, and coughing or sneezing can expose gaps along the edges of the mask, thereby allowing infected respiratory droplets to escape or enter. As an additional concern, N100- and N99-rated masks, and even N95-rated masks to some degree, provide high flow resistance that may make breathing difficult, especially for infected individuals already having respiratory difficulties. Consequently, the CDC actively discourages the wearing of N95 and higher rated masks, especially by individuals not trained in their use. Although lower rated masks may be more easily worn, they may leave a wearer more subject to infection. Moreover, the effectiveness of masks in promoting infection control may depend upon the proper and consistent use of masks by individuals potentially subject to encountering a readily spread pathogen.

Another potential route of infection from masks arises from touching a contaminated mask by removing and reusing it multiple times, or simply by adjusting a mask multiple times throughout the course of ordinary daily use. Contamination and disease transmittal of this type may arise with masks of any type, even N100 masks. Masks are often reused multiple times by a user, sometimes up to a month or more in length, particularly in view of ongoing shortages of personal protective equipment arising due to the current coronavirus pandemic. The high surface area of masks and the moist environment generated by passage of exhaled breath therethrough can create a fertile breeding ground for bacteria trapped by the mask, thereby increasing the risk of spreading a disease. Trapped viruses can similarly represent a contamination hazard in used masks, particularly in combination with pathogenic or non-pathogenic bacteria. In addition, contaminated masks need to be handled carefully to prevent cross-contamination when worn between one area and another. Pathogen transfer to various touch surfaces arising from adjustment of contaminated masks also may represent a significant concern. Used masks may also represent a significant biohazardous waste disposal issue. Other air filtration media (e.g., HEPA filters, air conditioning filters, HVAC or airplane/automobile cabin filters, and the like) likewise may accumulate pathogens in the course of their use, which may extend over months or years, and lead to similar concerns as a consequence of spreading pathogens that have accumulated on the filtration medium.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

FIGS. 1 and 2 show diagrams of presumed structures of metal nanoparticles having a surfactant coating thereon.

FIG. 3 shows an illustrative SEM image of substantially individual copper nanoparticles.

FIG. 4 shows an illustrative SEM image of an agglomerate of copper nanoparticles.

FIG. 5 shows an illustrative SEM image of a copper nanoparticle network obtained after fusion of a plurality of copper nanoparticles to each other.

FIGS. 6A and 6B show illustrative SEM images of agglomerates of copper nanoparticles adhered to textile fibers.

FIG. 7 shows an illustrative SEM image of agglomerates of copper nanoparticles adhered to fibers of a cellulose/polyester blend (55:45), in which fiber junctions are fused together.

FIG. 8 shows an illustrative photograph of a fabric having agglomerates of copper nanoparticles adhered thereto, as fabricated (left side of image) and after extended use (right side of image).

DETAILED DESCRIPTION

The present disclosure is generally directed to air filtration technology, including masks, respirators, inline air filters, and like air filtration systems, and, more specifically, to air filtration media, including systems and methods related thereto, that may limit secondary spread of diseases once a pathogen has become trapped thereon and been killed and/or inactivated upon contacting an agent associated with the air filtration media.

As discussed above, masks and related air filtration media may provide some protection against the spread of viruses, bacteria and other types of pathogens. However, the risk of secondary infection transmission remains high, since pathogens may remain active and sequestered in or upon an air filtration medium after use. Such trapped pathogens may frequently spread to various touch surfaces and foster secondary infection transmission. Sufficiently small pathogens may pass through an air filtration medium in some instances as well.

The present disclosure provides air filtration media, such as masks, respirators and inline filters, for example, that may lessen the likelihood of secondary transmission of pathogens trapped therein, as well as providing enhanced protection for a wearer or user. Industrial or residential air filtration devices such as air conditioning filters and other types of air handling systems may exhibit similar benefits through application of the disclosure herein. In particular, the present disclosure describes various types of air filtration media that are impregnated with a metal, such as copper and silver, having biocidal activity toward various types of pathogens. When pathogens, such as viruses and/or bacteria, sequestered within an air filtration medium are exposed to the metal, the metal may kill or inactivate the pathogens, thereby limiting the potential for secondary spread of disease to occur and better protecting a wearer or user. In addition to mitigating cross-contamination or transmission of pathogens and providing better wearer or user protection, metal incorporation may limit such pathogenic hazards following disposal as well, potentially decreasing waste disposal costs in some instances. For example, masks and other personal protective equipment incorporating a suitable metal may be disposed of in ordinary trash rather than being sequestered as biohazardous waste requiring more rigorous handling protocols.

Although it may be desirable to incorporate metals within air filtration media, doing so may be difficult to realize in practice with conventional metal incorporation approaches. Metallic silver and copper are difficult to incorporate within an air filtration medium due to the high melting point of these metals. Molten copper, for instance, forms at the melting point of copper (1083° C.), a temperature which is completely incompatible with the filtration media commonly used in air filtration devices and systems. The melting point of silver is likewise problematically high. Micron-size metal particles or flakes may be produced and incorporated as solids to an air filtration medium, but it may be difficult to promote sufficient adherence of the particles or flakes to an air filtration medium to afford robust performance. In addition, the biocidal activity of micron-size metal particles or flakes may not be much different than the biocidal activity of a bulk metal surface. Although both silver and copper surfaces possess some biocidal activity against some bacteria and viruses, even against some antibiotic-resistant bacteria strains in some instances, the rate of inactivation or killing of the pathogens may be rather slow. The slow rate of inactivation or killing of pathogens may leave open the possibility of secondary transmission of infections from a touch surface. Coronaviruses, for instance, may remain active for up to five days on surfaces such as glass, polymers, ceramics, rubber, and stainless steel, for example, and for as long as 7 days on a standard type of surgical mask.

As a solution to the foregoing difficulties, the present disclosure provides metal nanoparticles, particularly metal nanoparticle agglomerates, as a suitable vehicle for introducing metals into conventional air filtration media to afford improved biocidal activity and infection control resulting therefrom. Metal nanoparticles, particularly agglomerates thereof, represent a particularly advantageous construct for incorporating a metal, as discussed in further detail hereinbelow. Copper nanoparticles and/or silver nanoparticles may be particularly advantageous metal nanoparticles for conveying biocidal activity to an air filtration medium, given the known biocidal activity of bulk copper and silver surfaces. Nanoparticle forms of these metals may provide an especially advantageous vehicle for incorporating copper and/or silver upon an air filtration medium, particularly air filtration media comprising a plurality of fibers, due to robust surface adherence (e.g., to fibers) that may be realized when agglomerates of these metal nanoparticles are applied to the air filtration medium. Copper nanoparticles and silver nanoparticles may be used in combination with one another as well, which may afford complementary biocidal against the same or different pathogens that may be targeted or inactivated by each metal individually. Zinc, nickel, titanium and other bioactive metals may be utilized in further combination with either of these metals as well, including their respective oxides and/or oxides of copper and/or silver, as well as with other additive substances that may convey pathogenic activity toward bacteria and/or viruses.

Metal nanoparticles, such as silver and copper nanoparticles, as described further herein, can be readily produced as individual metal nanoparticles and/or agglomerated forms thereof that have a size range compatible with their ready incorporation within air filtration media commonly used in air filtration devices and systems. The small size of the metal nanoparticles and their agglomerates allows ready dispersion throughout a desired portion of the air filtration medium to be realized, or the metal nanoparticles and/or agglomerates thereof may be distributed in a gradient fashion upon or near one or more surfaces of the air filtration medium. Furthermore, due to their high surface energy, metal nanoparticles may become adhered to an air filtration medium following deposition thereon, thereby providing a robust structure that is capable of repeated handling during use. Adherence of the metal nanoparticles and agglomerates thereof may involve chemical bond formation once the metal nanoparticles have attained a high surface energy state.

Additionally, an adhesive layer to promote improved adherence of the metal nanoparticles to an air filtration medium may be further incorporated prior to or while applying metal nanoparticles to an air filtration medium as well. The adhesive layer, which may be permanently tacky, may be applied concurrently with the metal nanoparticles or separately. Application of an adhesive layer to an air filtration medium or portion thereof prior to deposition of metal nanoparticles thereon may afford initial sequestration of the metal nanoparticles during loading before more robust adherence is realized through further processing of the metal nanoparticles occurs, as discussed further below. As a further advantage, the adhesive may further promote prolonged release of active metal species from metal nanoparticles or agglomerates thereof following their adherence to the surface of an air filtration medium. Advantageously, metal nanoparticles or agglomerates thereof can be applied to an air filtration medium through various spray coating techniques, thereby allowing wide surface coverage to be realized while also affording ready control of the extent of metal loading. Alternative deposition techniques for incorporating metal nanoparticles or agglomerates thereof may also be suitable for use in the disclosure herein.

Air filtration media of the present disclosure may advantageously maintain biocidal activity against various pathogens over extended periods of time (e.g., days to weeks). Moreover, air filtration media having metal nanoparticles or agglomerates thereof adhered thereto may be at least partially self-indicating as they lose efficacy against pathogens during extended use. Air filtration media having active metal nanoparticle agglomerates thereon, for example, may maintain a black color or similar dark hue, whereas a much lighter color may develop after the biocidal activity has diminished (see FIG. 8).

As used herein, the term "metal nanoparticles" refers to metal particles that are about 250 nm or less in size, particularly about 200 nm or less in size or about 150 nm or less in size, without particular reference to the shape of the metal particles. Copper nanoparticles are metal nanoparticles comprising predominantly copper, optionally with an oxide coating. Likewise, silver nanoparticles are metal nanoparticles comprising predominantly silver, optionally with an oxide coating. The term "metal nanoparticle" broadly refers herein to any metallic structure having at least one dimension of about 250 nm or less, particularly about 200 nm or less or about 150 nm or less, and includes other structures that are not substantially spherical in nature, such as metal platelets/disks, metal nanowires, or the like. Other metal nanostructures may be used as alternatives to or in combination with spherical or substantially spherical metal nanoparticles, or agglomerates thereof, in the disclosure herein.

The term "metal nanoparticle agglomerates" and equivalent grammatical forms thereof refers to a grouping of metal nanoparticles having at least one dimension ranging from about 0.1 to about 35 microns in size, particularly about 0.1 to about 15 microns in size, and more particularly about 0.1 to about 5 microns in size. Individual metal nanoparticles within a metal nanoparticle agglomerate may reside within the size ranges indicated above, and the individual metal nanoparticles may be associated with one another through non-covalent, covalent, or metallic bonding interactions. The term "associated" refers to any type of bonding force that maintains a grouping of metal nanoparticles together. The bonding force may be overcome to produce individual metal nanoparticles in some instances.

The terms "consolidate," "consolidation" and other variants thereof are used interchangeably herein with the terms "fuse," "fusion" and other variants thereof.

The term "air filtration medium" refers to any porous construct through which air, a component of air, or a gas may traverse, preferably wherein the porous construct comprises a plurality of fibers or a fabric formed therefrom.

Before further discussing more particular aspects of the present disclosure in further detail, additional brief description of metal nanoparticles and their processing conditions, particularly silver or copper nanoparticles, will first be provided. Metal nanoparticles exhibit a number of properties that can differ significantly from those of the corresponding bulk metal. One property of metal nanoparticles that can be of particular importance for processing is nanoparticle fusion (consolidation) that occurs at the metal nanoparticles' fusion temperature. As used herein, the term "fusion temperature" refers to the temperature at which a metal nanoparticle liquefies, thereby giving the appearance of melting. At or above the fusion temperature, consolidation with other metal nanoparticles may readily take place. As used herein, the terms "fusion," "consolidation" and other grammatical forms thereof synonymously refer to the coalescence or partial coalescence of metal nanoparticles with one another to form a larger mass. Metal nanoparticles within a metal nanoparticle agglomerate may undergo fusion with one another or individual metal nanoparticles may become fused as well, thereby forming a network of at least partially fused metal nanoparticles in either case.

Advantageously and surprisingly, metal nanoparticles, such as silver and/or copper nanoparticles, can become adhered to other surfaces even well below the fusion temperature, thereby allowing bonding to an air filtration medium to take place, as discussed further herein. Depending on the density at which the metal nanoparticles are loaded onto the surface of the air filtration medium and the temperature at which they are processed thereon, individual metal nanoparticles may or may not be further fused together when adhered to the air filtration medium in the disclosure herein. Even more advantageously, metal nanoparticles may also be associated together with one another in the form of agglomerates when adhered to the air filtration medium, in which individual metal nanoparticles, which may or may not be fused together, are still identifiable. Metal nanoparticle agglomerates may be readily dispersed upon an air filtration medium and may likewise become adhered thereto. Advantageously, agglomeration of metal nanoparticles may facilitate retention within the air filtration media, as well as promote sustained release of active metal species once adherence to an air filtration medium has taken place.

Upon decreasing in size, particularly below about 20 nm in equivalent spherical diameter, the temperature at which metal nanoparticles liquefy drops dramatically from that of the corresponding bulk metal. For example, copper nanoparticles having a size of about 20 nm or less can have fusion temperatures of about 220° C. or below, or about 200° C. or below, in comparison to bulk copper's melting point of 1083° C. Silver nanoparticles may similarly display a significant deviation from the melting point of bulk silver below a nanoparticle size of about 20 nm. Thus, the consolidation of metal nanoparticles taking place at the fusion temperature can allow structures containing bulk metal to be fabricated at significantly lower processing temperatures than when working directly with the bulk metal itself as a starting material. Since air filtration media often exhibit limited thermal tolerance, metal nanoparticles may provide a particularly effective vehicle for introduction of metal thereto. The small particle sizes of metal nanoparticles may facilitate ready dispersion within a liquid medium for application to an air filtration medium, such as through a spraying process. Agglomerates of the metal nanoparticles, wherein the metal nanoparticles are fused or unfused but are associated together, may likewise be dispersible in liquid media for application to an air filtration medium according to the disclosure herein. Metal nanoparticle agglomerates may represent a particularly effective form of metal nanoparticles for application to an air filtration medium according to the disclosure herein due to their ready retention thereon. Once deposited upon a suitable air filtration medium, metal nanoparticles or agglomerates thereof may become strongly adhered thereto by increasing the temperature to at least the fusion temperature. Adherence of metal nanoparticles or agglomerates thereof to an air filtration medium may even take place without increasing the temperature above the fusion temperature to form bulk metal, sometimes even at room temperature, as described further hereinbelow. Thus, metal nanoparticle agglomerates having at least a majority of their metal nanoparticles unfused may be present in the air filtration media disclosed herein. Adherence may be further promoted with an adhesive, as discussed further herein.

A number of scalable processes for producing bulk quantities of metal nanoparticles in a targeted size range have been developed. Most typically, such processes for producing metal nanoparticles take place by reducing a metal precursor in the presence of one or more surfactants. The as-isolated metal nanoparticles may have a surfactant coating thereon and be isolated as a plurality of nanoparticle agglomerates. The agglomerates may be broken apart, while retaining the surfactant coating, or the agglomerates may be used directly without further processing. Particularly advantageous metal nanoparticle agglomerates may comprise metal nanoparticles ranging from about 50 nm to about 250 nm in size. In the case of adhering metal nanoparticles to the fibers of an air filtration medium, the agglomerates may be of an advantageous size range to facilitate dispensation via spraying and to promote retention in the air filtration medium. The metal nanoparticles or agglomerates thereof can be isolated and purified from a reaction mixture by common isolation techniques and undergo processing into a formulation suitable for dispensation upon an air filtration medium. The surfactant coating upon the metal nanoparticles may be removed through gentle heating, gas flow, and/or vacuum (any pressure below atmospheric pressure) once the metal nanoparticles have been deposited upon an air filtration medium, thereby affording a much higher surface energy and a commensurate increase in reactivity to promote adherence to the air filtration medium. Alternately, a surfactant coating may be lost upon extended contact with an air filtration medium without undergoing additional heating or other processing, with adherence to the air filtration medium occurring following surfactant loss. The metal nanoparticles may also become fused together with each other during this process, or they may remain unfused. Once the surfactant coating has been removed or lost, the resulting high surface energy of the metal nanoparticles may facilitate adherence of the metal nanoparticles to the air filtration medium through chemical bonding. The metal nanoparticles may or may not become fused to each other during the process of becoming adhered to the air filtration medium.

Metal nanoparticle agglomerates having a range of sizes, such as those within a range of about 0.1 microns to about 35 microns, or about 0.1 microns to about 15 microns, or about 0.1 microns to about 5 microns, may be advantageous in terms of their ability to be dispensed upon an air filtration medium, such as through aerosol formation or sprayed droplets. In addition to their ready dispensation and beneficial retention upon an air filtration medium, additional benefits may be realized once the metal nanoparticle agglomerates have become adhered to the surface of the air filtration medium following loss of a surfactant coating or through bonding to an adhesive layer. In particular, metal nanoparticle agglomerates may "shed" individual metal nanoparticles or small clusters of metal nanoparticles that possess a high degree of activity against various bacteria and viruses. Once released, the individual metal nanoparticles or small clusters of metal nanoparticles may migrate over the surface of the air filtration medium but without being released in vivo. By differentially releasing metal nanoparticles from metal nanoparticle agglomerates having a range of sizes, a time-release profile of metal nanoparticles may be realized to afford prolonged and rapid infection control capabilities. Efficacy over the period of time-release may be based upon the total loading of metal nanoparticle agglomerates per unit area. Thus, activity against various pathogens may be retained over several days, such as at least about 3 days, or at least about 5 days, or at least about 7 days, or at least about 10 days, or at least about 14 days, or at least about 21 days, or at least about 30 days. An adhesive layer in contact with the metal nanoparticle agglomerates may further facilitate a time-release profile of metal nanoparticles for conveying biocidal activity. Suitable adhesives within an adhesive layer are not considered to be particularly limited and are specified in more detail below.

Once a surfactant coating has been removed or lost from metal nanoparticles, an oxide coating may form thereon. Oxide-coated metal nanoparticles may also exhibit biocidal activity against bacteria and viruses, both as individual metal nanoparticles and within metal nanoparticle agglomerates. Complete conversion to metal oxide may occur in some instances. Oxidized metal nanoparticles may lead to the formation of reactive and potentially mobile salt compounds upon the surface of an air filtration medium. Such salts may include, for example, chlorides, bisulfites and bicarbonates. Chlorides, for example, may result from chloride ions in sweat, exhaled air or other bodily fluids that may come into contact with the air filtration medium. Formation of such salts may be particularly prevalent upon exposure of the metal nanoparticles to a moist environment, as specified for a bicarbonate salt in Reaction 1 below. Dry conditions, in contrast, may favor formation of at least a partial oxide coating upon the surface of the metal nanoparticles.

$$Cu+\tfrac{1}{2}O_{02}+H_2O+2CO_2 \rightarrow Cu(HCO_3)_2 \quad \text{(Reaction 1)}$$

The salts may be surfactant-stabilized salt complexes comprising one or more surfactants (e.g., one or more amine surfactants in the case of copper nanoparticles) and sufficient salt anions to achieve charge balance. Charge balancing anions may include, for example, halogen, particularly chloride; bisulfite; bicarbonate; lactate; or the like. The charge balancing anions are relatively labile and may be released to generate open coordination sites for binding DNA, proteins, or like biomolecules, which may afford biocidal activity toward bacteria and viruses in some instances. The surfactant-stabilized salt complexes may be relatively mobile upon the surface of an air filtration medium, even when bound within an adhesive, and provide a high effective coverage thereon, even at low metal nanoparticle loadings.

Any suitable technique can be employed for forming the metal nanoparticles used in the disclosure herein. Particularly facile metal nanoparticle fabrication techniques, particularly for copper nanoparticles, are described in U.S. Pat. Nos. 7,736,414, 8,105,414, 8,192,866, 8,486,305, 8,834,747, 9,005,483, 9,095,898, and 9,700,940, each of which is incorporated herein by reference in its entirety. Similar procedures may be used for synthesizing silver nanoparticles. As described therein, metal nanoparticles can be fabricated in a narrow size range by reduction of a metal salt in a solvent in the presence of a suitable surfactant system, which can include one or more different surfactants. Further description of suitable surfactant systems follows below. Tailoring of the surfactant system, the reaction concentration, temperature, and like factors may determine the size range of metal nanoparticles that are obtained from a metal nanoparticle synthesis. Without being bound by any theory or mechanism, it is believed that the surfactant system can mediate the nucleation and growth of the metal nanoparticles, limit surface oxidation of the metal nanoparticles while the surfactant system is adhered thereto, and/or inhibit metal nanoparticles from extensively aggregating with one another prior to being at least partially fused together. As noted above, small agglomerates of metal nanoparticles may be formed in many instances and used in the disclosure herein. Alternately, the metal nanoparticle agglomerates may be broken apart to form individual metal nanoparticles or smaller metal nanoparticle agglomerates. Suitable organic solvents for solubilizing metal salts and forming metal nanoparticles can include, for example, formamide, N,N-dimethylformamide, dimethyl sulfoxide, dimethylpropylene urea, hexamethylphosphoramide, tetrahydrofuran, glyme, diglyme, triglyme, tetraglyme, proglyme, or polyglyme. Reducing agents suitable for reducing metal salts and promoting the formation of metal nanoparticles can include, for example, an alkali metal in the presence of a suitable catalyst (e.g., lithium naphthalide, sodium naphthalide, or potassium naphthalide) or borohydride reducing agents (e.g., sodium borohydride, lithium borohydride, potassium borohydride, or tetraalkylammonium borohydrides). In non-limiting examples, reduction of the metal salt to form metal nanoparticles and agglomerates thereof may take place under substantially anhydrous conditions in a suitable organic solvent.

Figure 2:
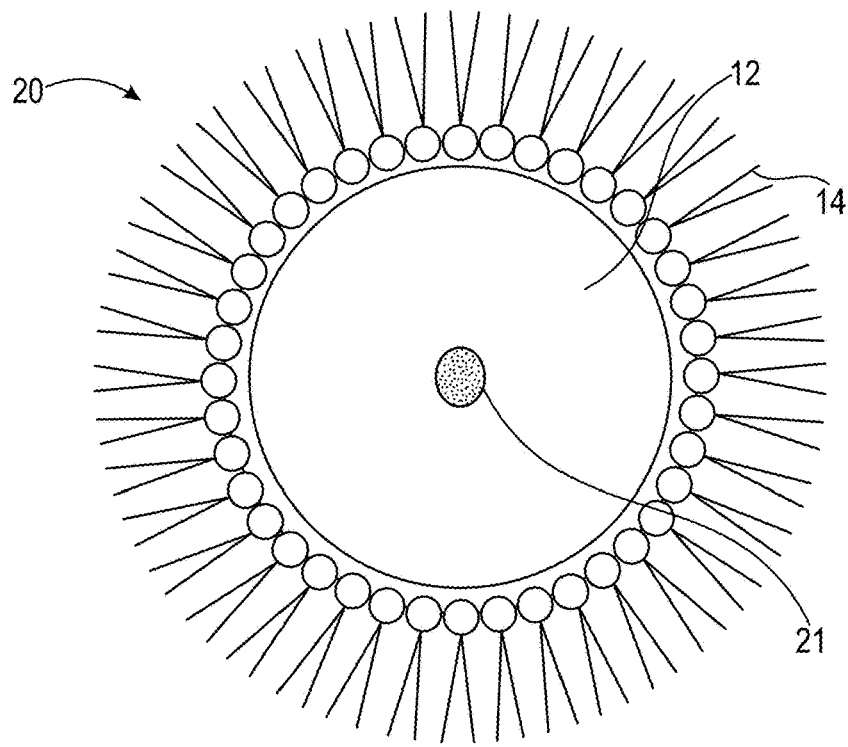
Figure 3:
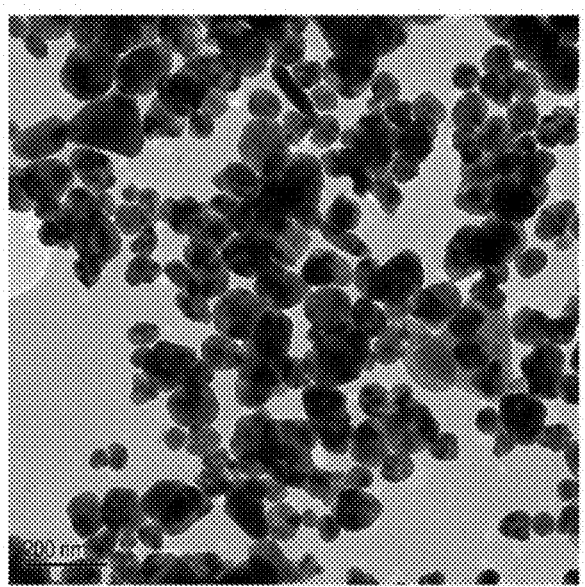
Figure 4:
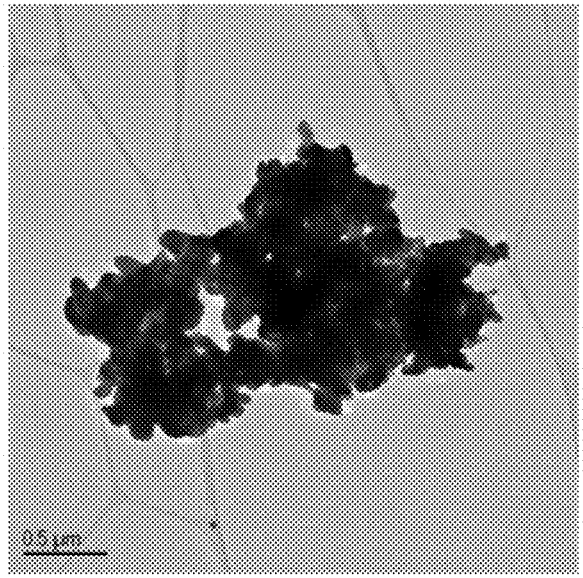
Figure 5:
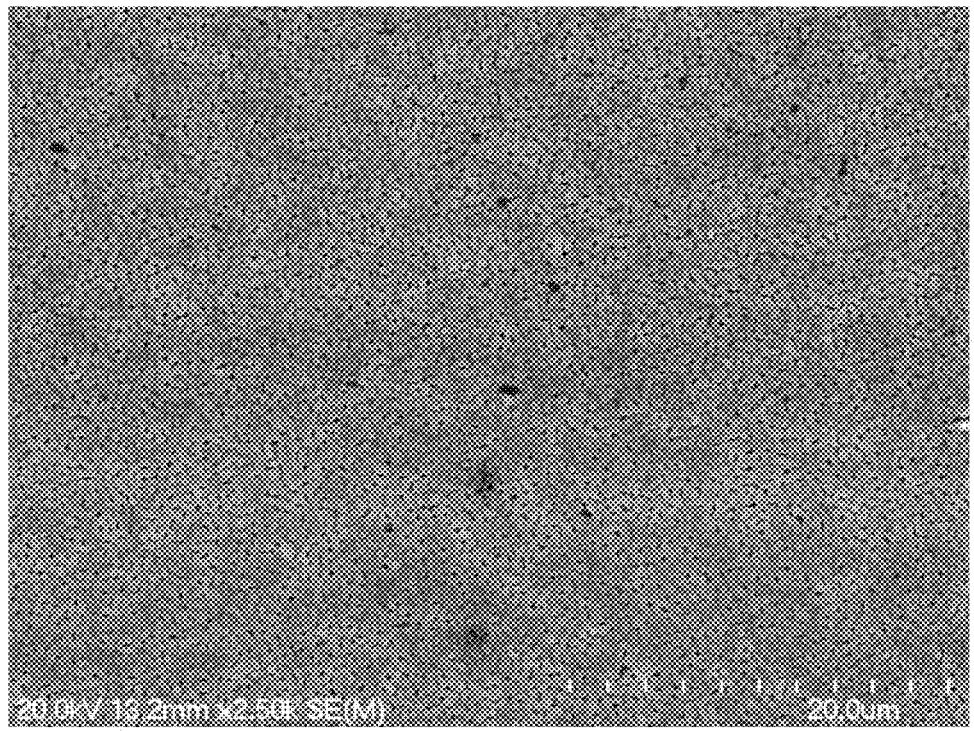
Figure 6A:
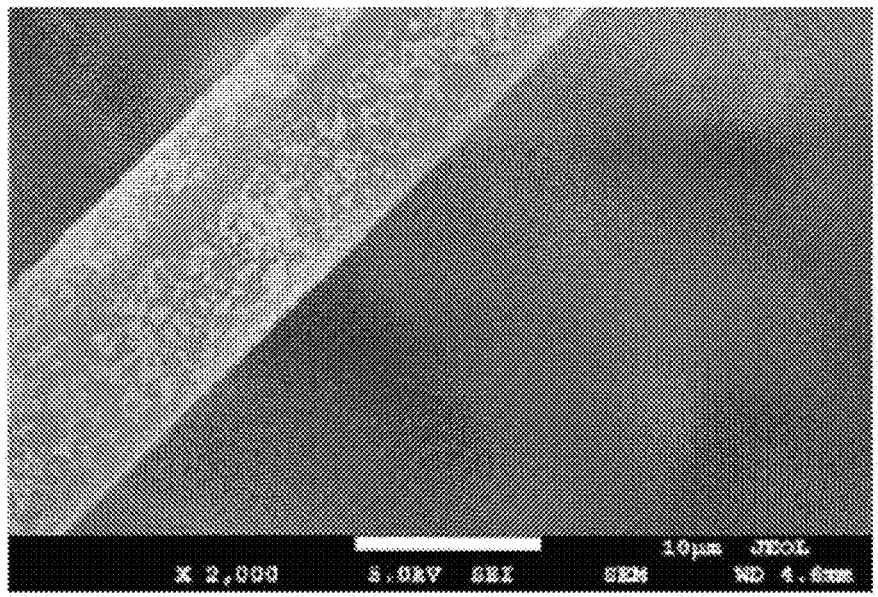
Figure 6B:
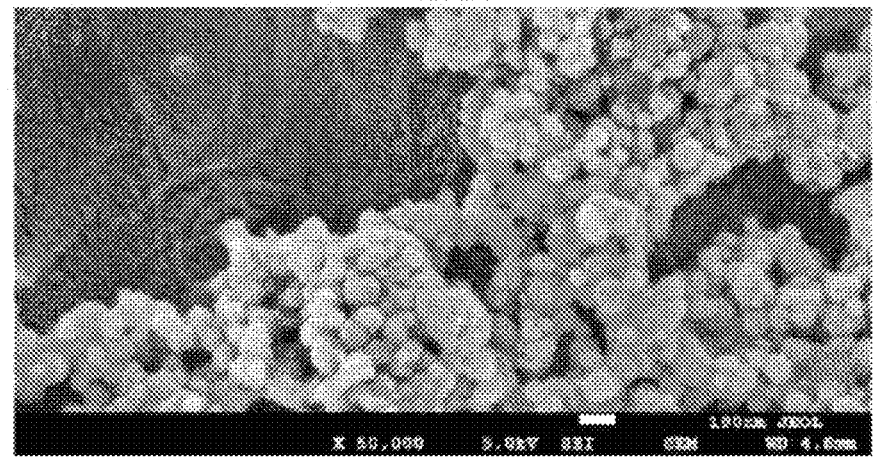
Figure 7:
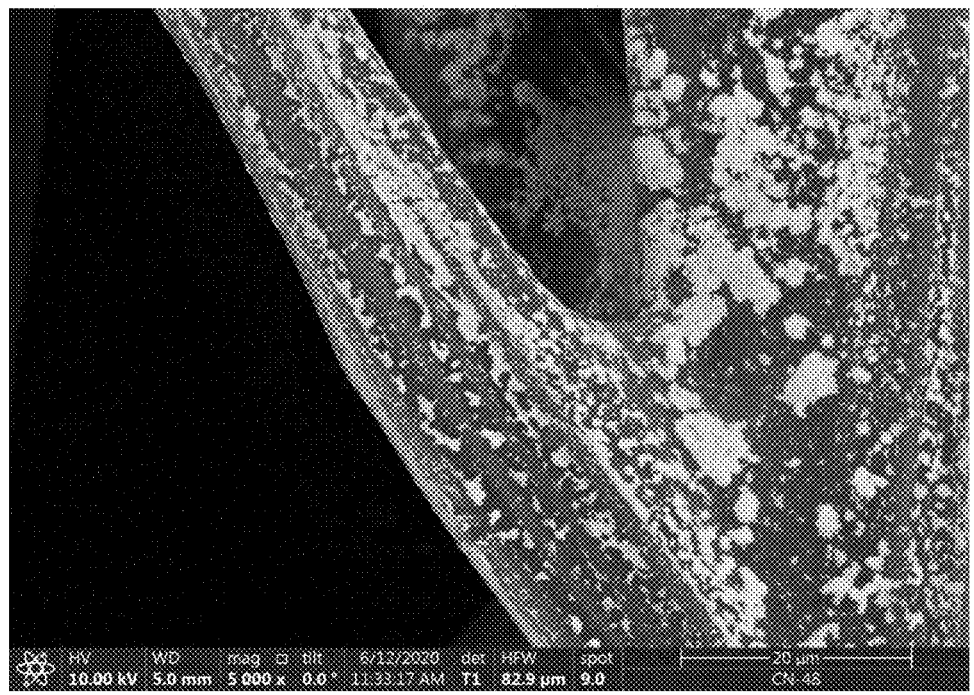

FIGS. 1 and 2 show diagrams of presumed structures of metal nanoparticles having a surfactant coating thereon. As shown in FIG. 1, metal nanoparticle 10 includes metallic core 12 and surfactant layer 14 overcoating metallic core 12. Surfactant layer 14 can contain any combination of surfactants, as described in more detail below. Metal nanoparticle 20, shown in FIG. 2, is similar to that depicted in FIG. 1, except metallic core 12 is grown about nucleus 21, which can be a metal that is the same as or different than that of metallic core 12. Because nucleus 21 is buried deep within metallic core 12 in metal nanoparticle 20 and is very small in size, it is not believed to significantly affect the overall nanoparticle properties. Nucleus 21 may comprise a salt or a metal, wherein the metal may be the same as or different than metallic core 12. In some embodiments, the nanoparticles can have an amorphous morphology. FIGS. 1 and 2 may be representative of the microscopic structure of individual copper or silver nanoparticles suitable for use in the disclosure herein. FIG. 3 shows an illustrative SEM image of substantially individual copper nanoparticles. FIG. 4 shows an illustrative SEM image of an agglomerate of copper nanoparticles, which may be used in the disclosure herein. FIG. 5 shows an illustrative SEM image of a copper nanoparticle network obtained after fusion of a plurality of copper nanoparticles to each other. FIGS. 6A and 6B show illustrative SEM images of agglomerates of copper nanoparticles adhered to textile fibers. The agglomerates of copper nanoparticles are robustly adhered to the textile fibers but do not undergo fusion with one another. FIG. 7 shows an illustrative SEM image of agglomerates of copper nanoparticles adhered to fibers of a cellulose/polyester blend (55: 45), in which fiber junctions are fused together. The bonding to textile fibers and similar fibers may be representative of the bonding that occurs when metal nanoparticle agglomerates contact a plurality of fibers within an air filtration medium according to the present disclosure.

As discussed above, as-formed metal nanoparticles may have a surfactant coating containing one or more surfactants upon their surface. The surfactant coating can be formed on the metal nanoparticles during their synthesis. Formation of a surfactant coating upon metal nanoparticles during their synthesis can desirably limit the metal nanoparticles from fusing to one another prematurely, limit agglomeration of the metal nanoparticles to a desired extent or a desired agglomerate size, and promote the formation of a population of metal nanoparticles having a narrow size distribution. At least partial loss of the surfactant coating may occur upon heating the metal nanoparticles up to the fusion temperature, including at least some surfactant loss well below the fusion temperature for low-boiling surfactants. Surfactant loss may be further promoted by flowing gas and/or application of vacuum (reduced pressure), as desired, even below the fusion temperature. At least some surfactant loss may occur at room temperature and/or atmospheric pressure in some instances, particularly over extended contact times with the surface of an air filtration medium. Following surfactant loss, fusion of the metal nanoparticles may take place above or below the fusion temperature. If the uncoated metal nanoparticles remain unfused, a high surface energy may be obtained within the air filtration medium, which may promote adherence thereto, such as to a plurality of fibers comprising the air filtration medium. The metal nanoparticles may become adhered to the air filtration medium even below the fusion temperature once the surfactant coating has been removed. When heated above the fusion temperature, nanoparticle fusion may take place in combination with the metal nanoparticles becoming adhered to the air filtration medium and to each other. When copper nanoparticles and silver nanoparticles are impregnated within the air filtration medium together, fusion between the copper nanoparticles and the silver nanoparticles may occur as well.

Various types of metal nanoparticles may be synthesized by metal reduction in the presence of one or more suitable surfactants, such as copper nanoparticles or silver nanoparticles. Copper and/or silver can be particularly desirable metals for use in the embodiments of the present disclosure due to their ability to promote pathogen killing or inactivation when deposited upon a surface. Significantly higher biocidal activity for both of these metals may be realized when utilizing metal nanoparticles compared to that obtained for a bulk metal surface. Copper may be particularly advantageous due to its low cost. Zinc and zinc oxide can similarly display biocidal activity against bacteria, viruses and similar microorganisms and may be substituted for copper or silver in any of the embodiments disclosed herein, or used in combination with these metals. NiO and $TiO_2$ may be used similarly in this respect.

In various embodiments, the surfactant system present within the metal nanoparticles can include one or more surfactants. The differing properties of various surfactants can be used to tailor the properties of the metal nanoparticles and agglomerates thereof. Factors that can be taken into account when selecting a surfactant or combination of surfactants for inclusion upon the metal nanoparticles can include, for example, ease of surfactant dissipation from the metal nanoparticles during or prior to nanoparticle fusion, nucleation and growth rates of the metal nanoparticles to impact the nanoparticle size, the metal component of the metal nanoparticles, the extent of metal nanoparticle agglomerate formation and size thereof, and the like. Main group metals, for example, may require different surfactants than do transition metals when forming metal nanoparticles.

In some embodiments, an amine surfactant or combination of amine surfactants, particularly aliphatic amines, can be present upon the metal nanoparticles. Amine surfactants can be particularly desirable for use in conjunction with copper nanoparticles or silver nanoparticles due to their good affinity for these transition metals. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. This combination of surfactants may be particularly effective for producing metal nanoparticles within a desired size range. Further disclosure regarding suitable amine surfactants follows hereinafter.

In some embodiments, the surfactant system can include a primary alkylamine. In some embodiments, the primary alkylamine can be a $C_2$-$C_{18}$ alkylamine. In some embodiments, the primary alkylamine can be a $C_7$-$C_{10}$ alkylamine. In other embodiments, a $C_5$-$C_6$ primary alkylamine can also be used. Without being bound by any theory or mechanism, the exact size of the primary alkylamine can be balanced between being long enough to provide an effective inverse micelle structure during synthesis versus having ready volatility and/or ease of handling during nanoparticle consolidation. For example, primary alkylamines with more than 18 carbons can also be suitable for use in the present embodiments, but they can be more difficult to handle because of their waxy character. $C_7$-$C_{10}$ primary alkylamines, in particular, can represent a good balance of desired properties for ease of use.

In some embodiments, the $C_2$-$C_{18}$ primary alkylamine can be n-hexylamine, n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the metal coordination sphere but be readily dissociable therefrom during metal nanoparticle consolidation.

In some embodiments, the surfactant system can include a secondary amine. Secondary amines suitable for forming metal nanoparticles can include normal, branched, or cyclic $C_4$-$C_{12}$ alkyl groups bound to the amine nitrogen atom. In some embodiments, the branching can occur on a carbon atom bound to the amine nitrogen atom, thereby producing significant steric encumbrance at the nitrogen atom. Suitable secondary amines can include, without limitation, dihexylamine, diisobutylamine, di-t-butylamine, dineopentylamine, di-t-pentylamine, dicyclopentylamine, dicyclohexylamine, and the like. Secondary amines outside the $C_4$-$C_{12}$ range can also be used, but such secondary amines can have undesirable physical properties such as low boiling points or waxy consistencies that can complicate their handling.

In some embodiments, the surfactant system can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present. In some embodiments, the alkyl groups can be $C_1$-$C_6$ alkyl groups. In other embodiments, the alkyl groups can be $C_1$-$C_4$ alkyl groups or $C_3$-$C_6$ alkyl groups. In some embodiments, $C_3$ or higher alkyl groups can be straight or have branched chains. In some embodiments, $C_3$ or higher alkyl groups can be cyclic. Without being bound by any theory or mechanism, it is believed that diamine chelating agents can facilitate metal nanoparticle formation by promoting nanoparticle nucleation.

In some embodiments, especially suitable diamine chelating agents can include N,N'-dialkylethylenediamines, particularly $C_1$-$C_4$ N,N'-dialkylethylenediamines. The corresponding methylenediamine, propylenediamine, butylenediamine, pentylenediamine or hexylenediamine derivatives can also be used. The alkyl groups can be the same or different. $C_1$-$C_4$ alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for inclusion upon metal nanoparticles include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly $C_1$-$C_4$ N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in forming metal nanoparticles include, for example, N,N,N',N'-tetramethylethylenediamine, N,N,N',N'-tetraethylethylenediamine, and the like.

Surfactants other than aliphatic amines can also be present in the surfactant system. In this regard, suitable surfactants can include, for example, pyridines, aromatic amines, phosphines, thiols, or any combination thereof. These surfactants can be used in combination with an aliphatic amine, including those described above, or they can be used in a surfactant system in which an aliphatic amine is not present. Further disclosure regarding suitable pyridines, aromatic amines, phosphines, and thiols follows below.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in forming metal nanoparticles include, for example, aniline, toluidine, anisidine, N,N-dimethylaniline, N,N-diethylaniline, and the like. Other aromatic amines that can be used in conjunction with metal nanoparticles can be envisioned by one having ordinary skill in the art.

Suitable pyridines can include both pyridine and its derivatives. Illustrative pyridines that can be suitable for inclusion upon metal nanoparticles include, for example, pyridine, 2-methylpyridine, 2,6-dimethylpyridine, collidine, pyridazine, and the like. Chelating pyridines such as bipyridyl chelating agents may also be used. Other pyridines that can be used in conjunction with metal nanoparticles can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be present upon metal nanoparticles include, for example, trimethylphosphine, triethylphosphine, tributylphosphine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with metal nanoparticles can be envisioned by one having ordinary skill in the art.

Suitable thiols can have a formula of RSH, where R is an alkyl or aryl group having from about 4 to about 16 carbon atoms. Illustrative thiols that can present upon metal nanoparticles include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with metal nanoparticles can be envisioned by one having ordinary skill in the art.

As mentioned above, a distinguishing feature of metal nanoparticles is their high surface energy, particularly after removal of a surfactant coating therefrom, which may promote adherence to an air filtration medium according to the disclosure herein. Robust adherence to an air filtration medium may still be realized with the surfactant coating intact, however, particularly when an adhesive layer is used. Metal nanoparticles, such as agglomerates of silver nanoparticles and/or copper nanoparticles, as well as zinc nanoparticles, nickel nanoparticles, titanium nanoparticles or their oxides, optionally in combination with silver nanoparticles and/or copper nanoparticles, may be admixed with a solvent in a spray formulation suitable for deposition upon an air filtration medium in the disclosure herein. The spray formulations may be used to facilitate metal introduction to the air filtration medium prior to adherence upon a surface thereof. In addition to promoting dispersion in a suitable spray formulation, one or more surfactants associated with the metal nanoparticles as a surfactant coating may further facilitate initial surface adhesion to the air filtration medium prior to surfactant coating loss and formation of uncoated metal nanoparticles having a high surface energy. That is, the surfactant coating may initially hold metal nanoparticle agglomerates in place until a high surface energy state has been attained to promote more robust adherence and retention of the metal nanoparticles upon fibers of the air filtration medium.

As-produced metal nanoparticles are usually produced in the form of large agglomerates which need to be broken apart into smaller agglomerates and/or individual surfactant-coated metal nanoparticles in order to promote use in various applications. Surprisingly, in the disclosure herein, the as-produced agglomerates, such as those residing in a 0.1-35 micron size range, particularly a 1-15 micron size range or a 1-5 micron size range, can be effective for spray dispensation and retention within an air filtration medium. Agglomerates of these sizes, and even larger, may be more effectively retained within an air filtration medium than are individual metal nanoparticles or smaller agglomerates. Such agglomerates may change their shape as they adhere to an air filtration medium, while remaining bound to each other in a "colony." Within the agglomerates, recognizable sub-structures may be present prior to nanoparticle fusion such as, but not limited to, 10-50 nm thick platelets having a width of about 100-250 nm, 1-5 nm thick platelets having a width of about 30-50 nm, 100-250 nm wide spheres, metal nanowires, the like, or any combination thereof. The sub-structures may have any shape such as square, triangular, rectangular, multi-faceted, round, and ovular, and crystalline, and/or non-crystalline morphologies. Elongate structures, such as metal nanowires, may have an aspect ratio of at least about 10 or at least about 25, for example. Copper nanoparticles and/or silver nanoparticles may also be combined with pre-made nanowires (e.g., copper nanowires or silver nanowires) and deposited upon an air filtration medium as well. Zinc, nickel, or titanium, particularly in the form of nanoparticles or a metal oxide form thereof, may be present in any of these embodiments as well.

Accordingly, air filtration media of the present disclosure may comprise a plurality of fibers having a plurality of metal nanoparticle agglomerates adhered thereto, in which the metal nanoparticle agglomerates comprise a plurality of fused, partially fused, and/or unfused metal nanoparticles that are associated with one another upon a surface of the plurality of fibers. Optionally, the metal nanoparticles may be substantially free of a surfactant coating after becoming adhered to the plurality of fibers. In some embodiments, the metal nanoparticles may retain their surfactant coating when adhered to the plurality of fibers and/or at least a majority of the metal nanoparticles within the metal nanoparticle agglomerates may remain unfused with one another. In any embodiment herein, the metal nanoparticle agglomerates may be adhered to the air filtration medium via an adhesive layer, as described further herein.

In the disclosure herein, the metal nanoparticles may comprise copper nanoparticles, silver nanoparticles, or any combination thereof. Without being bound by any theory or mechanism, it is believed that Cu(0) may be oxidized to Cu(I) on the air filtration medium in a slow process, with further oxidation to Cu(II) taking place rapidly thereafter. When contacting a pathogen, such as bacteria or viruses, hydroxyl radicals and lipid radicals may form, which may disrupt the outer lipid bilayer or protein shell of a virus or bacterium. In addition, copper may bind to heteroatoms (e.g., S, N or P) within amino acids, proteins, DNA and/or RNA of viruses, bacteria and other pathogens to result in inactivation. Metal penetration within a cell membrane or protein coat may also occur, wherein the metal may inhibit DNA/RNA replication and/or inhibit protein transport. Silver nanoparticles may promote biocidal activity through similar mechanisms.

Combinations of copper nanoparticles and silver nanoparticles may afford particular synergy against pathogens not remediated adequately with a single metal alone. That is, copper nanoparticles and silver nanoparticles may convey biocidal activity against different pathogens. In addition, enhanced activity against a particular pathogen may be realized when both copper nanoparticles and silver nanoparticles are present, as compared to copper nanoparticles or silver nanoparticles alone. Without being bound by theory or mechanism, two different types of metal nanoparticles may target different biological pathways and receptors within a pathogen, thereby affording more effective killing or inactivation than is possible with either type of metal nanoparticle alone.

Metal nanoparticles, such as silver nanoparticles and/or copper nanoparticles or agglomerates thereof, may be admixed with an aerosolizable fluid medium in spray formulations suitable for deposition upon an air filtration medium according to the disclosure herein. Suitable aerosolizable fluid media and spray formulations are described in greater detail hereinbelow. Dip coating and similar liquid processing techniques may also be suitable for introducing metal nanoparticles upon an air filtration medium in the disclosure herein as well.

Spray formulations comprising metal nanoparticle agglomerates, such as silver nanoparticles and/or copper nanoparticles and their agglomerates, may be prepared by dispersing as-produced or as-isolated nanoparticles in an organic matrix containing one or more organic solvents or other medium in which the metal nanoparticle agglomerates may be admixed as a well-dispersed solid in a fluid medium. Optionally, the fluid medium may comprise one or more inorganic components as well, particularly water. As used herein, the term "spray formulation" refers to a fluid composition containing dispersed metal nanoparticles, either as individual metal nanoparticles, agglomerated metal nanoparticles, or any combination thereof, that is suitable for dispensation through spraying. Spray formulations refer to both pumped and forced sprays and sprays dispensed through use of an aerosol propellant. Pumped and forced sprays may be dispensed through inert gas pressurization, and/or through pressurization with a mechanical or pneumatic pump.

Particularly suitable organic solvents that may be present in spray formulations suitable for dispensation by pumping or pressurization include a $C_1$-$C_{11}$ alcohol, or multiple $C_1$-$C_{11}$ alcohols in any combination. Additional alcohol-miscible organic solvents may also be present. Ketone and aldehyde organic solvents, also in the $C_1$-$C_{11}$ size range, may also be used, either alone or in combination with one or more alcohols. Ketone and aldehyde solvents are less polar than are alcohols and may aid in promoting dispersion of metal nanoparticles and/or agglomerates thereof. Low boiling ethers such as diethyl ether, dipropyl ether, and diisopropyl ether, for example, may also be suitably used to promote metal nanoparticle dispersion. One or more glycol ethers (e.g., diethylene glycol, triethylene glycol, or the like), alkanolamines (e.g., ethanolamine, triethanolamine, or the like), or any combination thereof may also be used alone or in combination with one or more alcohols or any of the other foregoing organic solvents. Various glymes may also be used similarly. Water-miscible organic solvents and mixtures of water and water-miscible organic solvents may be used as well, such as water-organic solvent mixtures comprising up to about 50% water by volume, or up to about 75% water by volume, or up to about 90% water by volume. The organic solvent(s) may be removed either before or after the surfactant coating is lost in the course of promoting adherence of the metal nanoparticles to the air filtration medium.

In particular examples, the spray formulations can contain one or more alcohols, which may be $C_1$-$C_{11}$, $C_1$-$C_4$, $C_4$-$C_{11}$ or $C_7$-$C_{11}$ in more particular embodiments. $C_1$-$C_4$ alcohols may be particularly desirable due to their lower boiling points, which may facilitate solvent removal following dispensation. In various embodiments, the alcohols can include any of monohydric alcohols, diols, or triols. One or more glycol ethers (e.g., diethylene glycol and triethylene glycol), alkanolamines (e.g., ethanolamine, triethanolamine, and the like), or any combination thereof may be present in certain embodiments, which may be present alone or in combination with other alcohols. Various glymes may be present with the one or more alcohols in some embodiments.

Spray formulations suitable for dispensation by pumping or forced pressurization with a gas may exhibit a viscosity value of about 1 cP to about 500 cP, including about 1 cP to about 100 cP. Low viscosity values such as these may facilitate dispensation through spraying promoted by mechanical pumping or forced pressurization. Metal nanoparticle loadings within the spray formulations to produce the foregoing viscosity values may range from about 1 wt. % to about 35 wt. %, or about 5 wt. % to about 35 wt. %, or about 10 wt. % to about 25 wt. %, or about 8 wt. % to about 25 wt. %, or about 1 wt. % to about 8 wt. %.

Spray formulations comprising an aerosol propellant may also be suitable for applying metal nanoparticle agglomerates to an air filtration medium according to the disclosure herein. Such spray formulations may similarly comprise metal nanoparticles or agglomerates thereof dispersed in a fluid medium comprising at least an aerosol propellant and optionally other solvents to promote metal nanoparticle dispersion therein. Aerosol spray formulations may constitute a particularly desirable form for dispensing the metal nanoparticles, since aerosol spray cans are in wide use and are easily manufactured and shipped. Aerosol propellants may afford sprayed droplets ranging from about 10-150 microns in size, whereas mechanically pumped or forced pressurization sprays may have a larger droplet size in a range of about 150-400 microns.

Any conventional aerosol propellant may be utilized in a spray formulation, provided that the metal nanoparticle agglomerates can be effectively dispersed therein, optionally in combination with one or more additional solvents, and ejected from a spray can. Organic and/or inorganic aerosol propellants may be used. Suitable inorganic aerosol propellants may include, for example, nitrous oxide or carbon dioxide. Suitable organic aerosol propellants may include, for example, volatile hydrocarbons (e.g., ethane, propane, butane, or isobutane), dimethyl ether, ethyl methyl ether, hydrofluorocarbons, hydrofluoroolefins, or any combination thereof. Chlorofluorocarbons and similar compounds may also be used as an aerosol propellant, but their use is not preferred due to their ozone-depleting properties. Nevertheless, chlorofluorocarbons may be satisfactory alternatives in situations where other organic aerosolizable fluid media may not be effectively used.

When using an aerosol propellant to promote dispensation of metal nanoparticle agglomerates, the metal nanoparticle agglomerates may be directly combined therewith, or the metal nanoparticles may be dissolved in a secondary fluid medium that is subsequently combined with the aerosol propellant in a spray can or similar container. Suitable secondary fluid media may comprise organic solvents such as alcohols, glycols, ethers, or the like. Any of the organic solvents utilized above in mechanically pumped or forced pressurization spray formulations may be incorporated in spray formulations containing an aerosol propellant as a secondary fluid medium as well.

Spray formulations comprising an organic solvent may comprise a mixture of organic solvents that evaporates in a specified period of time, typically under ambient conditions. In non-limiting examples, evaporation may take place in about 1 minute or less, or about 2 minutes or less, or about 5 minutes or less, or about 10 minutes or less, or about 15 minutes or less, or about 30 minutes or less. To facilitate evaporation, the metal nanoparticles may be dispersed as a concentrate in a higher boiling organic solvent, such as a $C_{10}$ alcohol, which is then combined with a much larger quantity of low boiling organic solvent, such as ethanol or diethyl ether, optionally in further combination with additional organic solvents. The high boiling organic solvent may be sufficiently hydrophobic to facilitate dispersion of the metal nanoparticles in the less hydrophobic and lower boiling organic solvent comprising the majority of the organic phase.

In various embodiments, the individual metal nanoparticles within the metal nanoparticle agglomerates disposed upon the air filtration medium or present in a spray formulation may be about 20 nm or more in size, more particularly about 50 nm or more in size. In particularly suitable examples, all or at least about 90%, at least about 95%, or at least about 99% of the metal nanoparticles may be about 20 nm to about 200 nm in size or about 50 nm to about 250 nm in size. Smaller copper nanoparticles (under 20 nm) may tend to undergo more extensive oxidation than do larger metal nanoparticles, and such metal nanoparticles may be present to support a desired extent of oxidation. For example, smaller copper nanoparticles may tend to undergo more extensive oxidation into CuO or $Cu_2O$, including partial or complete oxidation into their compounds, than do larger copper nanoparticles having a size above 20 nm. Copper nanoparticles in the foregoing size range (20 nm or above, or about 50 nm or above) may afford a coating comprising a mixture of CuO and $Cu_2O$ upon a metallic copper metal core, the combination of which may be advantageous for inactivating pathogens upon an air filtration medium according to the disclosure herein. Silver nanoparticles in a similar size range may form a coating comprising silver oxide upon a metallic silver core. When copper nanoparticles and/or silver nanoparticles are agglomerated together in the air filtration medium and adhered thereto, the oxide coating may extend over at least a portion of the surface of the agglomerate, leaving an exposed copper or silver metal surface below within the porosity of the agglomerate. By having larger metal nanoparticles in the foregoing size range, a substantial amount of zero-valent metal may be retained for promoting biocidal activity, whereas smaller metal nanoparticles may form too much oxide to promote optimal bioactivity.

Copper nanoparticles that are about 20 nm or less in size can have a fusion temperature of about 220° C. or below (e.g., a fusion temperature in the range of about 140° C. to about 220° C.) or about 200° C. or below, which can provide advantages for certain applications, as noted above. Silver nanoparticles about 20 nm or less in size may similarly exhibit a fusion temperature differing significantly from that of the corresponding bulk metal. Larger metal nanoparticles (either copper or silver nanoparticles), in turn, have a higher fusion temperature, which may rapidly increase and approach that of bulk metal as the nanoparticle size continues to increase. Depending on the processing temperature and the fusion temperature of the metal nanoparticles based upon their size, the metal nanoparticles may or may not be fused within the air filtration medium when processed according to the disclosure herein. For example, copper and/or silver nanoparticles may remain substantially unfused when processed according to the disclosure herein, even if their surfactant coating is lost or not. Regardless of whether the metal nanoparticles are fused to each other or not after the surfactant coating is removed, the metal nanoparticles may experience robust adherence to the air filtration medium. Surface oxidation of the metal nanoparticles may take place during this process, as discussed above.

When deposited upon an air filtration medium comprising a plurality of fibers, the metal nanoparticle agglomerates may be located predominantly upon at least one outer surface of the air filtration medium (i.e., upon an outer surface layer of the air filtration medium) or extend up to a depth of about 3-4 fiber layers in addition to the outer surface layer when deposited by spray coating. For example, a multi-layer air filtration medium may have metal nanoparticle agglomerates adhered to at least one outer layer (surface) of the air filtration medium, and one or more inner layers may or may not contain metal nanoparticles. In another example, the air filtration medium may define a removable insert within a structure not having metal nanoparticles adhered thereto. For example, the air filtration medium may comprise a removable insert for a mask (e.g., a cloth mask). The insert may be removed for washing the cloth mask. The insert or any other air filtration medium disclosed herein may be self-sterilizing due to the presence of the metal nanoparticle agglomerates. When present as an insert or similar structure, an exposed surface of the air filtration medium having adhered metal nanoparticle agglomerates may be covered with an outer liner to preclude direct exposure of the metal nanoparticle agglomerates to a wearer. Suitable liners may include porous media, such as woven or non-woven fabrics, lacking adhered metal nanoparticle agglomerates. Roll-to-roll dip coating and gravure coating may also afford predominantly a surface coating of metal nanoparticle agglomerates upon an outer surface of an air filtration medium. The predominant surface coating ensures efficient use of the metal nanoparticles for promoting biocidal activity compared to other types of dip coating processes, wherein metal nanoparticles may be deposited more deeply throughout predominantly all of the fiber layers of a multi-layer fabric. Metal nanoparticle agglomerates buried within deeper fiber layers may be ineffective or less effective for conveying biocidal activity since more of the metal nanoparticles agglomerates are remote from the surface of the air filtration medium, where the loading of bacterial or viral pathogens is likely to be higher.

The loading of metal nanoparticle agglomerates upon the air filtration medium may include a coverage density ranging from about 0.1 $mg/in^2$ to about 10 $mg/in^2$, or about 0.5 $mg/in^2$ to about 5 $mg/in^2$, or about 1 $mg/in^2$ to about 2 $mg/in^2$ or about 0.5 $mg/in^2$ to about 3 $mg/in^2$. The coverage of metal nanoparticle agglomerates upon the air filtration medium may range from about 5% to about 95% by area, or about 50% to about 99% by area, or about 60% to 95% by area. Even coverage densities as low as 3-5% by area may be effective for biocidal activity in the disclosure herein due to the mobility of individual metal nanoparticles or small metal nanoparticle agglomerates shed from adhered, larger metal nanoparticle agglomerates. When present at the foregoing coverages and coverage densities upon the air filtration medium, the metal nanoparticles may effectively inactivate various pathogens, including certain bacteria and viruses, oftentimes more effectively than does a bulk metal surface comprising the same metal. For example, copper nanoparticles adhered to an air filtration medium and retaining their nanoparticulate form within a plurality of nanoparticle agglomerates may inactivate/kill viruses in as little as 30 seconds. Up to 100% kill rates or inactivation rates may be realized in such a short time. Bulk copper surfaces, in contrast, may take several hours to reach the same level of inactivation. Bacteria may undergo similar levels of inactivation or killing in various instances.

In addition to metal nanoparticle agglomerates or alternative nanostructures, other additives may be incorporated upon the air filtration medium and/or within spray formulations suitable for producing an air filtration medium according to the disclosure herein. Suitable additives may include, but are not limited to, those capable of producing reactive oxygen species (ROS), which may cause lipid, protein, or DNA damage in microorganisms, eventually leading to cell membrane damage and cell death. These additives may complement or enhance the biocidal activity conveyed by copper nanoparticles, silver nanoparticles, or alternative metal nanoparticles having biocidal activity, such as those comprising zinc, nickel, titanium, and/or their oxide forms.

NiO may be included as an additive upon the filtration medium or within spray formulations suitable for producing the filtration medium. NiO is very efficient in producing ROS when present in small concentrations. NiO may be effective when included at, for example, about 0.5% to about 10% of the load of copper nanoparticles and/or silver nanoparticles in a spray formulation (e.g., 0.5 mg to 100 mg NiO) as sub-micron particles separate distinct from the copper nanoparticles and/or silver nanoparticles. At these loadings, NiO is very effective against certain bacteria, which may broaden the biocidal effectiveness of copper or silver. Bismuth, zinc, and tin oxides may be similarly effective at loadings of about 0.5% to about 10% of the mass of copper nanoparticles and/or silver nanoparticles.

$TiO_2$ may be included as an additive upon the filtration medium or within spray formulations suitable for producing the filtration medium. $TiO_2$ may catalyze the formation of hydroxyl radicals upon UV irradiation (e.g., in sunlight) when the filtration medium is taken outdoors. Moisture from a wearer's breath or atmospheric moisture may supply the source of water for producing the hydroxyl radicals by photooxidation. $TiO_2$ may be present at about 1% to about 25% of the load of copper nanoparticles and/or silver nanoparticles in a spray formulation or upon an air filtration medium. The $TiO_2$ may likewise be present in the form of nanoparticles and/or micron-size particles (e.g., about 100 nm to about 5 microns).

Copper nanoparticles and/or silver nanoparticles, ZnO, NiO and/or $TiO_2$ may also be used in combination with one another as well. These additives may be sprayed upon the filtration medium at the same time as copper nanoparticles and/or silver nanoparticles (from the same spray formulation or different spray formulations), or may be sprayed before or after the copper nanoparticles and/or silver nanoparticles.

After depositing the spray formulation upon the filtration medium, removal of the solvent and optionally surfactants may take place. Although solvents and surfactants may be removed under ambient conditions (room temperature and atmospheric pressure), application of at least one of heating, gas flow, and/or vacuum (reduced pressure) may accelerate removal of the solvent and surfactants from the air filtration medium, thereby leading to the metal nanoparticle agglomerates becoming adhered to the air filtration medium. Heating may take place at any temperature up to or beyond the fusion temperature of the metal nanoparticles, provided that the heating temperature is not so high that the air filtration medium itself experiences thermal damage. Thus, the metal nanoparticles may be fused or unfused when adhered to the air filtration medium. Moreover, the heating temperature need not necessarily exceed the normal boiling point or reduced pressure boiling point of the surfactants and solvents in order to promote their removal. Gentle heating well below the boiling point of the surfactant and solvent may be sufficient to promote their removal in many instances. In non-limiting embodiments, the heating may be conducted under flowing nitrogen, air or other inert gas or under vacuum to promote removal. For example, heating the air filtration medium at a temperature of about 35° C. to about 65° C. in flowing nitrogen or air may be sufficient to remove the solvent and surfactant, thereby leaving unfused metal nanoparticles distributed throughout the air filtration medium as a plurality of metal nanoparticle agglomerates. Additional heating may be conducted thereafter, if desired, to promote metal nanoparticle fusion. In either case, after the surfactants are removed from the nanoparticle surface, robust adherence to the air filtration medium may be realized. When heating under higher temperatures, use of an inert atmosphere, such as nitrogen, may be desirable to limit degradation of the air filtration medium and to control the amount of surface oxidation taking place upon the metal nanoparticles once the surfactant coating has been removed.

Once the surfactant coating has been removed from the metal nanoparticles, particularly copper nanoparticles and/or silver nanoparticles, the metal nanoparticles and/or agglomerates thereof may undergo at least partial oxidation. As indicated above, in the case of copper nanoparticles, the size of the copper nanoparticles and the agglomerates thereof may be selected such that at least some copper metal remains following oxidation, since a mixture of copper metal (metallic copper) and oxidized copper may be beneficial for promoting pathogen inhibition or killing. Silver nanoparticles may similarly experience different amounts of surface oxidation depending upon the size of the silver nanoparticles and how they are processed. In non-limiting embodiments, following surfactant removal, copper nanoparticles may form a reaction product within an air filtration medium comprising about 25% to about 99% metallic copper by weight or about 45% to about 90% metallic copper by weight, about 0.5% to about 60% $Cu_2O$ by weight, and about 0.1% to about 80% CuO by weight or about 0.1% to about 20% CuO by weight. In more particular embodiments, the amount of metallic copper may be about 45% to about 90% by weight, or about 50% to about 70% by weight, and the amount of $Cu_2O$ may be about 10% by weight or less, such as about 0.1% to about 10% by weight or less or about 5% to about 10% by weight or less, and the amount of CuO may be about 1% by weight or less, such as about 0.1% to about 1% by weight or about 0.5% to about 1% by weight. The $Cu_2O$ and CuO may form a coating (shell) upon the metal nanoparticles or agglomerates thereof that is about 10 nm or greater in thickness, or 100 nm or greater in thickness, such as about 100 nm to about 3 microns thick in many instances.

Silver nanoparticles adhered to the air filtration medium may similarly comprise about 25% to about 99% metallic silver by weight and the balance being $Ag_2O$. The $Ag_2O$ may similarly be present in a coating (shell) having a thickness of about 10 nm or greater, such as about 100 nm to about 3 microns thick.

In addition to metal nanoparticles and other additives, the spray formulations and air filtration media disclosed herein may further comprise an adhesive that is suitable for promoting nanoparticle adherence to fibers within the air filtration media. That is, the air filtration media disclosed herein may also have an adhesive layer thereon that may further enhance adherence to fibers comprising the air filtration media. When an adhesive layer is present, the metal nanoparticle agglomerates may become adhered to the air filtration medium, even without removal of the surfactant coating taking place. The adhesive layer may be applied with the metal nanoparticle agglomerates (i.e., in a suitable spray formulation or dip coating formulation) or already be present upon the air filtration medium before the metal nanoparticle agglomerates are applied thereto. Both contact and non-contact adhesives may be employed for this purpose. Suitable adhesives will be familiar to one having ordinary skill in the art and include conventional epoxy adhesives, nitrile rubber adhesives, acrylic adhesives, styrene-acrylic adhesives, cyanoacrylate adhesives, solvent-based adhesives, aqueous emulsions, and the like. The adhesive may be present at a loading of about 0.1 mg/in$^2$ to about 0.5 mg/in$^2$ upon the air filtration medium. Suitable loadings of the adhesive in the spray formulations or similar formulations may range from about 0.35 g adhesive/100 g spray formulation to about 2.75 g adhesive/100 g spray formulation. Coverage of the adhesive layer upon the air filtration medium may range from about 50% to about 100% by area, or about 60% to about 90% by area, or about 75% to about 95% by area, or about 90% to about 99% by area. A layer thickness of the adhesive layer upon the air filtration medium may be about 300 nm or less, such as about 1 nm to about 2 nm, or about 2 nm to about 5 nm, or about 5 nm to about 10 nm, or about 10 nm to about 50 nm, or about 10 nm to about 300 nm. In addition to promoting surface adherence, the adhesive may slow down the production of oxidized metal species, thereby affording further tailoring of the time-release profile of individual or small agglomerates of metal nanoparticles or various oxidized forms thereof.

When applying an adhesive layer to the surface of an air filtration medium, the adhesive may be present in a spray formulation or dip coating formulation applied to the air filtration medium, or an adhesive formulation and a spray formulation or dip coating formulation comprising metal nanoparticles may be applied separately. The adhesive formulation may be applied upon the air filtration medium first, followed by the spray formulation or dip coating formulation comprising metal nanoparticles, or the adhesive formulation and the metal nanoparticles may be applied concurrently. As a still further option, an adhesive may be applied to the air filtration medium after depositing metal nanoparticle agglomerates thereon.

Air filtration media on which the metal nanoparticle agglomerates may be applied and adhered according to the disclosure herein are not considered to be particularly limited. Any conventional air filtration medium may be treated with metal nanoparticles, particularly copper nanoparticles and/or silver nanoparticles, according to the disclosure herein. Illustrative air filtration media may comprise a plurality of fibers, which may be natural or synthetic fibers such as cellulosic, cotton, glass or polymer fibers, for example. Suitable polymer fibers may include, but are not limited to, polyester, polypropylene, polystyrene, or any combination thereof. Fiber combinations may define a fiber blend having metal nanoparticle agglomerates adhered thereto. Suitable air filtration media that may be impregnated with metal nanoparticles according to the disclosure herein include, for example, media rated N95, N99, or N100. Lower grade masks, such as surgical masks, cloth masks and dust masks, for example, also may have metal nanoparticle agglomerates adhered thereto according to the disclosure herein. The air filtration medium may be in a form of a fabric, tape, sheet, film, or any combination thereof. In addition, the air filtration medium may be in the form of a removable insert, which may be inserted within a mask not otherwise having antiseptic activity conveyed thereto by the presence of metal nanoparticle agglomerates.

Fabrics comprising a plurality of fibers may be woven or non-woven in nature, single-layered or multi-layered, and/or pleated or non-pleated. The term "fabric" refers to both regular and irregular arrangements of individual fibers, which may or may not be further bonded together. Woven fabrics may be formed by arranging individual fibers together in a substantially regular pattern without adhering the fibers together. Non-woven fabrics, in contrast, may be formed by arranging individual fibers together and bonding the fibers together through chemical, mechanical, heat, or solvent treatment. Pleating within an air filtration medium may increase the amount of contact surface area for contact with air or gas. Any of the foregoing types of fabrics utilized in the disclosure herein. In particular examples, a suitable fabric may be multi-layered and metal nanoparticle agglomerates may be distributed in a concentration gradient among multiple layers of the fabric.

The structure and/or type of air filtration medium undergoing impregnation with metal nanoparticle agglomerates according to the disclosure herein is likewise not considered to be particularly limited. Air filtration media located within masks (e.g. dust masks and surgical masks), respirators, inline filters for air handlers, car or airplane cabin filters, medical filters, biomedical research filters, HEPA filters, or the like may be impregnated with metal nanoparticle agglomerates, such as copper nanoparticles and/or silver nanoparticles, according to the disclosure herein to convey biocidal activity thereto. Air filtration systems may comprise at least one filter comprising the air filtration media disclosed herein. The air filtration medium may comprise a fabric, which may be woven, non-woven, and/or melt-blown with varying porosity in the disclosure herein. The air filtration medium may be present in the form of an insert in some instances.

Loading of metal nanoparticle agglomerates may be substantially uniform throughout an air filtration medium, or the metal nanoparticle agglomerates may be localized at or an outer surface of the air filtration medium (e.g., within the top 3-4 fabric layers of a multi-layer fabric), optionally with an outer liner present thereon. For a dust mask or similar personal protective equipment, a loading of metal nanoparticle agglomerates within the air filtration medium may be about 100 mg to about 2 g, for example. Larger commercial air filters may incorporate a commensurately larger amount of copper nanoparticles and/or silver nanoparticles in agglomerated form. Suitable loads of metal nanoparticle agglomerates upon the air filtration medium may range from about 0.5 wt. % to about 20 wt. %, or about 1 wt. % to about 15 wt. %, each based upon a total weight of the air filtration medium. Considerations for determining a suitable metal (e.g., copper or silver) loading upon the air filtration medium include, for example, the length or number of times the air filtration medium is intended to be used and the overall flux of air passing therethrough over the period of intended use.

Masks, for example, may comprise a dome shape suitable for snug fitting around the face, mouth and nose of a wearer. The mask may have an overall area of about 28-30 square inches, with the loading of copper or silver ranging from about 0.5 mg/in$^2$ to about 70 mg/in$^2$, or about 6.5 mg/in$^2$ to about 25 mg/in$^2$, or about 3.5 mg/in$^2$ to about 15 mg/in$^2$, or about 0.5 mg/in$^2$ to about 10 mg/in$^2$, or about 1 mg/in$^2$ to about 2.5 mg/in$^2$, or about 3.5 mg/in$^2$ to about 6 mg/in$^2$. Suitable masks may be single-layered or comprise multiple layers of air filtration media that are bonded together at the edges. An adhesive may be included to bond the layers together and/or to facilitate adherence of the metal nanoparticle agglomerates to the air filtration medium. Copper nanoparticles and/or silver nanoparticles may be sprayed onto an inner layer of the mask, and then an outer liner may be placed upon the inner layer of the filtration medium, such that the outer liner intercedes between the metal nanoparticles and a wearer of the mask. This arrangement may limit the accidental inhalation of metal nanoparticles and/or additives from the mask. The air filtration medium may also be present as an insert that is placed between layers of a mask, such as a cloth mask. Alternately, the air filtration medium of a mask may be single-layered or multi-layered and have at least one outer surface of the air filtration medium with metal nanoparticle agglomerates adhered thereto. The outer surface facing away from a wearer and/or the outer surface facing a wearer of the mask may have metal nanoparticle agglomerates adhered thereto. Such preparations may be readily incorporated into current manufacturing processes for masks of various types.

Inline filters may similarly comprise a multi-layer structure containing metal nanoparticle agglomerates adhered to fibers. The multi-layer structure may comprise a pleated or non-pleated multi-layer fabric, for example. The inline filter may include the metal nanoparticle agglomerates upon an outer surface of the air filtration medium, or the metal nanoparticle agglomerates may be adhered to one or more inner layers of a multi-layer fabric, which are then covered with an outer liner through which an airflow may pass. Again, the outer liner may aid in trapping metal nanoparticles incidentally released from the fibers such that they do not travel further in an air filtration system containing the inline filter, such as ductwork of an air conditioning system or the lines of a gas handling system.

In view of the disclosure above, methods for forming an air filtration medium having metal nanoparticle agglomerates adhered thereto may comprise: providing an air filtration medium comprising a plurality of fibers; applying a plurality of metal nanoparticle agglomerates to the air filtration medium, in which the plurality of metal nanoparticle agglomerates comprises a plurality of metal nanoparticles having a surfactant coating thereon when applied to the plurality of fibers; and adhering the plurality of metal nanoparticle agglomerates to the plurality of fibers. Optionally, the methods may comprise removing the surfactant coating from the plurality of metal nanoparticles such that the plurality of metal nanoparticle agglomerates become adhered to the plurality of fibers. In other non-limiting examples, the metal nanoparticle agglomerates may become adhered to the plurality of fibers by an adhesive layer, in which case the surfactant layer may remain intact. When adhered to the plurality of fibers, the plurality of metal nanoparticles may comprise a plurality of fused, partially fused, and/or unfused metal nanoparticles that are associated with one another upon a surface of the plurality of fibers. In non-limiting examples, applying the plurality of metal nanoparticle agglomerates to the air filtration medium may comprise spraying a metal nanoparticle formulation onto the air filtration medium. Removing the surfactant coating, when performed, may comprise applying heat, gas flow, vacuum, or any combination thereof to the air filtration medium after applying the plurality of metal nanoparticle agglomerates thereto.

Treatment of an airflow, including exhaled air from a wearer of a mask or similar piece of personal protective equipment, may comprise providing an air filtration medium of the present disclosure; passing an air flow through the air filtration medium, in which the air flow has a pathogenic load before passing through the air filtration medium; and decreasing the pathogenic load, inactivating or killing one or more pathogens, or any combination thereof upon passing the air flow through the air filtration medium. The one or more pathogens may comprise Covid-19 in particular examples.

Embodiments disclosed herein include:

A. Air filtration media. The air filtration media comprise: a plurality of fibers having a plurality of copper nanoparticles or silver nanoparticles adhered thereto, the copper nanoparticles or silver nanoparticles being fused, partially fused, or unfused upon a surface of the fibers, and the copper nanoparticles or silver nanoparticles being substantially free of a surfactant coating when adhered to the fibers.

A1. Dust masks comprising the air filtration media of A.

A2. Inline air filters comprising the air filtration media of A.

B. Methods for loading copper or silver upon a filtration medium. The methods comprise: providing a filtration medium comprising a plurality of fibers; applying a plurality of copper nanoparticles or silver nanoparticles to the filtration medium upon a surface of the fibers, the copper nanoparticles or silver nanoparticles comprising a surfactant coating thereon; and removing the surfactant coating from the copper nanoparticles or silver nanoparticles, such that the copper nanoparticles or silver nanoparticles become adhered to the plurality of fibers.

Each of embodiments A, A1, A2 and B may have one or more of the following additional elements in any combination:

Element 1: wherein the copper nanoparticles or silver nanoparticles are substantially free of an amine coating.

Element 2: wherein the fibers comprise cellulosic fibers, cotton fibers, polymer fibers, or any combination thereof.

Element 3: wherein the copper nanoparticles or silver nanoparticles range in size from about 20 nm to about 150 nm.

Element 4: wherein the silver nanoparticles are aggregated as a plurality of copper or silver nanoparticle agglomerates having a size ranging from about 1 micron to about 5 microns.

Element 5: wherein the silver nanoparticles comprise metallic silver and silver oxide when substantially free of the surfactant coating, or the copper nanoparticles comprise metallic copper and one or more copper oxides when substantially free of the surfactant coating.

Element 6: wherein the filtration medium further comprises silver nanoparticles or copper nanoparticles adhered to the plurality of fibers Element 7: wherein the copper nanoparticles comprise about 25% to about 99% by weight metallic copper, 0.5% to about 60% $Cu_2O$ by weight, and about 0.1% to about 20% CuO by weight.

Element 8: wherein the copper nanoparticles comprise about 45% to about 90% by weight metallic copper, 0.5% to about 60% $Cu_2O$ by weight, and about 0.1% to about 20% CuO by weight.

Element 9: wherein a loading of silver nanoparticles upon the plurality of fibers ranges from about 0.5 wt. % to about 20 wt. %.

Element 10: wherein applying the plurality of copper nanoparticles or silver nanoparticles to the filtration medium comprises spraying a copper nanoparticle or silver nanoparticle formulation onto the filtration medium.

Element 11: wherein removing the surfactant coating comprises applying heat, vacuum, or any combination thereof to the filtration medium after applying the plurality of copper nanoparticles or silver nanoparticles thereto.

Element 12: wherein the surfactant coating comprises one or more amines.

Element 13: wherein the copper nanoparticles or silver nanoparticles are aggregated as a plurality of copper or silver nanoparticle agglomerates having a size ranging from about 1 micron to about 5 microns when applied to the filtration medium.

By way of non-limiting example, exemplary combinations applicable to A, A1 and A2 include: 1 and 2; 1 and 3; 1 and 4; 1, 3 and 4; 1 and 5; 1, 5 and 6; 1, 5, 6, and 7 or 8; 1 and 9; 2 and 3; 2 and 4; 2-4; 2 and 5; 2, 5 and 6; 2, 5, 6, and 7 or 8; 2 and 9; 3 and 4; 3 and 5; 3, 5 and 6; 3, 5, 6, and 7 or 8; 5 and 6; 5-7; 5, 6 and 8; 5 and 9; 5, 6 and 9; 6, 7 and 9; 6, 8 and 9; and 8 and 9. By way of further non-limiting example, exemplary combinations applicable to B include, but are not limited to, 2 and 3; 2 and 5; 2, 5 and 6; 2, 5, 6, and 7 or 8; 3 and 5; 3, 5 and 6; 3, 5, 6, and 7 or 8; 5, 6 and 7; 5, 6 and 8; 5 and 9; 5, 6, and 7 or 8; 5, 6 and 9; 6, 7 or 8, and 9, any of which may be in further combination with one or more of 10, 11, 12 or 13. Additional exemplary combinations applicable to B include, but are not limited to, 2 and 10; 2 and 11; 2 and 12; 2 and 13; 3 and 10; 3 and 11; 3 and 12; 3 and 13; 5 and 10; 5 and 11; 5 and 12; 5 and 13; 5, 6 and 10; 5, 6 and 11; 5, 6 and 12; 5, 6 and 13; 5, 6, 7 or 8, and 10; 5, 6, 7 or 8, and 11; 5, 6, 7 or 8, and 12; and 5, 6, 7 or 8, and 13.

Additional embodiments disclosed herein include:

A'. Air filtration media. The air filtration media comprise: a plurality of fibers having a plurality of metal nanoparticle agglomerates adhered thereto, the metal nanoparticle agglomerates comprising a plurality of fused, partially fused, and/or unfused metal nanoparticles that are associated with one another upon a surface of the plurality of fibers.

A1'. Masks comprising the air filtration medium of A'.

A2'. Inline air filters comprising the air filtration medium of A'

A3'. Air filtration systems comprising at least one filter comprising the air filtration medium of A'.

B'. Methods for forming an air filtration medium. The methods comprise: providing an air filtration medium comprising a plurality of fibers; applying a plurality of metal nanoparticle agglomerates to the air filtration medium, the plurality of metal nanoparticle agglomerates comprising a plurality of metal nanoparticles having a surfactant coating thereon when applied to the plurality of fibers; and adhering the plurality of metal nanoparticle agglomerates to the plurality of fibers; wherein the plurality of metal nanoparticle agglomerates comprise a plurality of fused, partially fused, and/or unfused metal nanoparticles that are associated with one another upon a surface of the plurality of fibers.

C': Methods for treating an air flow. The methods comprise: providing an air filtration medium comprising a plurality of fibers having a plurality of metal nanoparticle agglomerates adhered thereto, the metal nanoparticle agglomerates comprising a plurality of fused, partially fused, and/or unfused metal nanoparticles that are associated with one another upon a surface of the plurality of fibers; passing an air flow through the air filtration medium, the air flow having a pathogenic load before passing through the air filtration medium; and decreasing the pathogenic load, inactivating or killing one or more pathogens, or any combination thereof upon passing the air flow through the air filtration medium.

Each of embodiments A', A1', A2', A3', B' and C' may have one or more of the following additional elements in any combination:

Element 1': wherein the air filtration medium is multi-layered, and at least one outer layer of the air filtration medium has metal nanoparticle agglomerates adhered thereto.

Element 2': wherein the air filtration medium defines a removable insert for the mask.

Element 3': wherein the metal nanoparticles within the metal nanoparticle agglomerates comprise copper nanoparticles, silver nanoparticles, or any combination thereof.

Element 4': wherein the metal nanoparticle agglomerates further comprise NiO, ZnO, $TiO_2$ or any combination thereof.

Element 5': wherein the plurality of fibers comprise cellulosic fibers, cotton fibers, polymer fibers, glass fibers, or any combination thereof.

Element 6': wherein at least a majority of the metal nanoparticles within the metal nanoparticle agglomerates range from about 20 nm to about 250 nm in size or from about 50 nm to about 250 nm in size.

Element 7': wherein the metal nanoparticle agglomerates range from about 0.1 micron to about 35 microns in size, or wherein the metal nanoparticle agglomerates range from about 0.1 micron to about 35 microns in size when applied to the air filtration medium.

Element 8': wherein the metal nanoparticles are silver nanoparticles comprising metallic silver and a silver oxide coating.

Element 9': wherein the metal nanoparticles are copper nanoparticles comprising metallic copper and a coating comprising $Cu_2O$, CuO or any combination thereof.

Element 10': wherein the copper nanoparticles comprise about 25% to about 99% metallic copper by weight, about 0.5% to about 60% $Cu_2O$ by weight, and about 0.1% to about 20% CuO by weight or about 0.1% to about 80% CuO by weight.

Element 11': wherein the copper nanoparticles comprise about 45% to about 90% metallic copper by weight, about 0.5% to about 60% $Cu_2O$ by weight, and about 0.1% to about 20% CuO by weight or about 0.1% to about 80% CuO by weight.

Element 12': wherein a loading of metal nanoparticles upon the plurality of fibers ranges from about 0.5 wt. % to about 20 wt. % based on a total weight of the air filtration medium.

Element 13': wherein the plurality of fibers collectively define a woven fabric, a non-woven fabric, or any combination thereof.

Element 14': wherein the woven or non-woven fabric is multi-layered, and the metal nanoparticle agglomerates are distributed in a concentration gradient among multiple layers of the woven or non-woven fabric.

Element 15': wherein the metal nanoparticles are substantially free of a surfactant coating after becoming adhered to the plurality of fibers.

Element 16': wherein at least a majority of the metal nanoparticles in the metal nanoparticle agglomerates are unfused with one another.

Element 17': wherein the air filtration medium is self-sterilizing.

Element 18': wherein the plurality of metal nanoparticle agglomerates are adhered to the plurality of fibers via an adhesive layer.

Element 19': wherein applying the plurality of metal nanoparticle agglomerates to the air filtration medium comprises spraying a metal nanoparticle formulation onto the air filtration medium.

Element 20': wherein the method further comprises removing the surfactant coating from the plurality of metal nanoparticles, such that the plurality of metal nanoparticle agglomerates become adhered to the plurality of fibers.

Element 21': wherein removing the surfactant coating comprises applying heat, gas flow, vacuum, or any combination thereof to the air filtration medium after applying the plurality of metal nanoparticle agglomerates thereto.

Element 22': wherein the surfactant coating comprises one or more amines.

Element 23': wherein at least a majority of the metal nanoparticles in the metal nanoparticle agglomerates are unfused with one another.

By way of non-limiting example, exemplary combinations applicable to A', A1', A2', A3' and C include, but are not limited to, 1' and 3'; 1', 3' and 4'; 1' and 6'; 1' and 7'; 1', 9', and 10' or 11'; 1' and 14'; 1' and 16'; 1' and 17'; 1' and 18'; 1' and 22'; 1' and 23'; 3' and 6'; 3' and 7'; 3', 9', and 10' or 11'; 3' and 14'; 3' and 16'; 3' and 17'; 3' and 18'; 3' and 22'; 3' and 23'; 6' and 7'; 6', 9', and 10' or 11'; 6' and 14'; 6' and 16'; 6' and 17'; 6' and 18'; 6' and 22'; 6' and 23'; 7', 9', and 10' or 11'; 7' and 14'; 7' and 16'; 7' and 17'; 7' and 18'; 7' and 22'; 7' and 23'; 9', and 10' or 11'; 9' and 14'; 9' and 16'; 9' and 17'; 9' and 18'; 9' and 22'; 9' and 23'; 14' and 16'; 14' and 17'; 14' and 18'; 14' and 22'; 14' and 23'; 6' and 17'; 16' and 18'; 16' and 22'; 16' and 23'; 18' and 22'; 18' and 23'; and 22' and 23'. Any of the foregoing are applicable to B', optionally in further combination with one or more of 19'-23'.

To facilitate a better understanding of the present disclosure, the following examples of preferred or representative embodiments are given. In no way should the following examples be read to limit, or to define, the scope of the invention.

Examples

Figure 8:
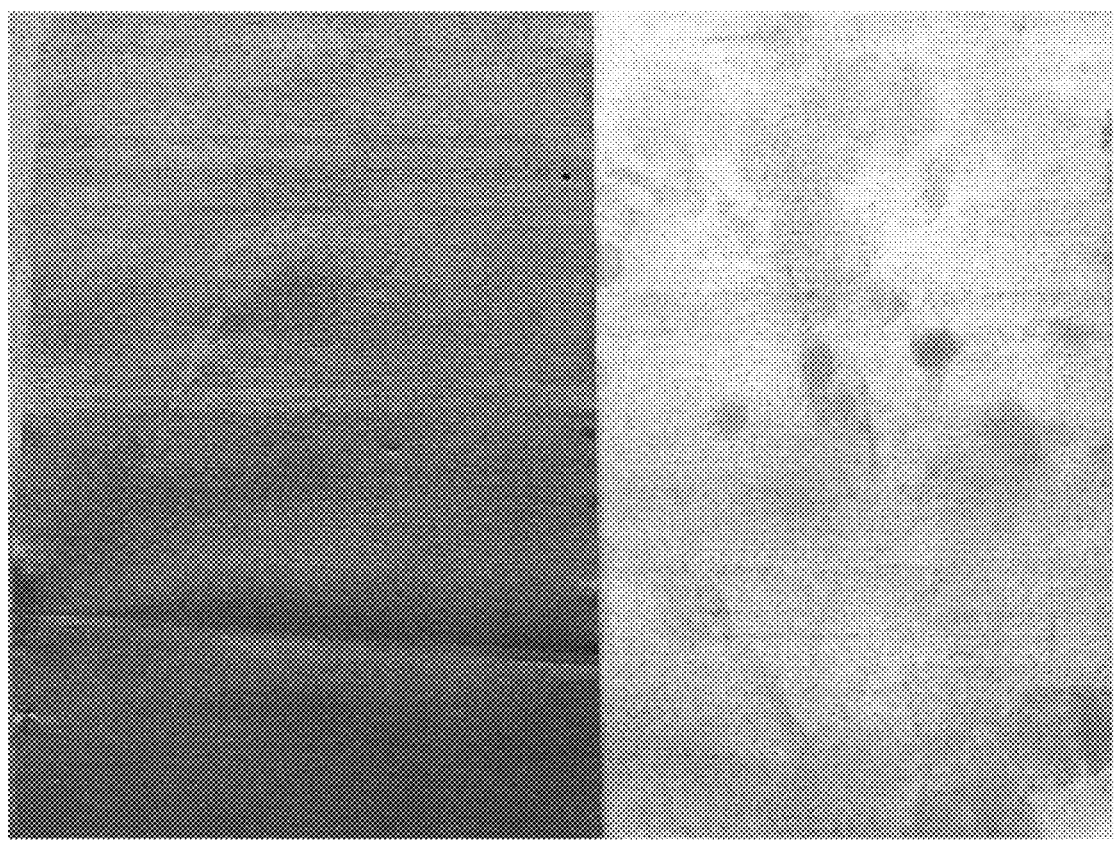

Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 20-50 nm thick, and the metal nanoparticle agglomerates were partially embedded in the adhesive layer with a substantial portion still exposed. The areal coverage of the agglomerates upon the fiber surfaces was about 20-50%. The copper loading upon the fabric ranged from about 1.2 mg/in$^2$ to about 2.7 mg/in$^2$. Depending on size, some of the agglomerates may have the surfactant layer partially removed, thereby resulting in partial oxidation and an overall mixture of copper metal, $Cu_2O$ and $CuO$ species on the fiber surface. The copper metal to oxide ratio may reside in the 1-10% range. Over time, oxidation and dissolution progressively result in fading of the initial dark brown-red color to more light yellow-green. FIG. 8 shows an illustrative photograph of a fabric having agglomerates of copper nanoparticles adhered thereto, as fabricated (left side of image) and after extended use (right side of image). The nanoparticle-loaded fabric was then subjected to various stability and toxicological tests specified below.

Agglomerates of copper nanoparticles in the 20-150 nm size range with a partially removed monolayer of amine surfactants on their surfaces and having an agglomerate size of 5-15 microns were adhered to a 30/70 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 50-100 nm thick and the metal nanoparticle agglomerates were partially embedded in the adhesive layer with a substantial portion still exposed. The areal coverage of the agglomerates upon the fiber surfaces is about 30-70%. The copper loading upon the fabric ranged from about 2.3 mg/in$^2$ to about 4.5 mg/in$^2$. Depending on size, some of the agglomerates may be fully or partially oxidized, thereby resulting in an overall mixture of copper metal, $Cu_2O$ and $CuO$ species on the fiber surface. The copper metal to oxide ratio may reside in the 5-25% range.

Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 100-250 nm thick, and the metal nanoparticle agglomerates were partially embedded in the adhesive layer with a substantial portion still exposed. The areal coverage of the agglomerates upon the fiber surfaces is about 10-35%. The copper loading upon the fabric ranged from about 1.7 mg/in$^2$ to about 3.5 mg/in$^2$. Depending on size, some of the agglomerates may be fully or partially oxidized, thereby resulting in an overall mixture of copper metal, $Cu_2O$ and $CuO$ species on the fiber fabric surface. The copper metal to oxide ratio may reside in the 5-15% range.

Agglomerates of copper nanoparticles in the 50-200 nm size range with a monolayer of amine surfactants on their surfaces and having an agglomerate size of 1-35 microns were adhered to a 100% polypropylene fabric (melt-blown) with an average fiber diameter of about 10 microns using an epoxy adhesive. This may be done via spray coating a suitable ink or dye formulation onto the fibers, or dip coating or gravure coating via a commercial process. The adhesive layer was about 35-150 nm thick, and the metal nanoparticle agglomerates were partially embedded in the adhesive layer with a substantial portion still exposed. The areal coverage of the agglomerates on the fiber surfaces is about 5-30%. The copper loading upon the fabric ranged from about 0.7 mg/in$^2$ to about 1.6 mg/in$^2$. Depending on size, some of the agglomerates may be fully or partially oxidized, thereby resulting in an overall mixture of copper metal, $Cu_2O$ and $CuO$ species on the fiber surface. The copper metal to oxide ratio may reside in the 1-5% range.

Agglomerates of copper nanoparticles in the 35-200 nm size range with a monolayer of amine surfactants on their surfaces and having an agglomerate size of 3-25 microns were adhered to a 100% cotton fabric with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 50-150 nm thick, and the metal nanoparticle agglomerates were partially embedded in the adhesive layer with a substantial portion still exposed. The areal coverage of the agglomerates upon the fiber surfaces was about 40-75%. The copper loading upon the fabric ranged from about 2.7 mg/in$^2$ to about 4.5 mg/in$^2$. Depending on size, some of the agglomerates may be fully or partially oxidized, thereby resulting in an overall mixture of copper metal, $Cu_2O$ and $CuO$ species on the fiber surface. The copper metal to oxide ratio may be in the 3-25% range.

Agglomerates of copper nanoparticles in the 20-150 nm size range with a monolayer of amine surfactants on their surfaces were mixed with 35-100 nm size $CuO$ particles at a weight ratio of 25-50%. The agglomerates (5-15 microns in size) were adhered to a 30/70 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 50-200 nm thick, and the agglomerates were partially embedded in the adhesive layer with a substantial portion still exposed. The areal coverage of the agglomerates upon the fiber surfaces was about 30-70%. The copper/copper oxide loading upon the fabric ranged from about 1.3 mg/in$^2$ to about 2.4 mg/in$^2$.

Agglomerates of copper nanoparticles in the 20-250 nm size range with a monolayer of amine surfactants upon their surface were mixed with 35-100 nm size $CuO$ particles at a weight ratio of 25-50%, along with NiO or ZnO at a 2-10% weight ratio. The agglomerates (5-15 microns in size) were adhered to a 30/70 cellulose/polyester fabric blend with an average fiber diameter of about 10 micron using an epoxy adhesive. This may be done via spray coating of a suitable ink or dye formulation onto the fibers, or dip coating or gravure coating via a commercial process. The adhesive layer was about 50-150 nm thick, and the agglomerates were partially embedded in the adhesive layer with a substantial portion still exposed. The areal coverage of the agglomerates upon the fiber surfaces was about 20-50%. The overall metal/metal oxide loading upon the fabric ranged from about 1.3 mg/in$^2$ to about 2.4 mg/in$^2$.

Stability testing. A 6"×6" sheet of fabric was tumbled in water for 8 hours. Only 1.4% of the available copper by weight (0.54 mg) was released into the water.

Shedding was also determined by exposing the fabric to simulated breathing conditions (8.4 and 40.8 m/min face velocity gas flow) and analyzing a filter trap for liberated copper by SEM or EDS. The shedding tests did not reveal detectable liberation of copper from the fabric.

VOCs. No volatile organic compounds (VOCs) from a battery of 70 standard VOCs were detected as being released from the fabric when tested under standard conditions.

Direct exposure to cell growth media. A piece of fabric was first soaked in supplemented cell growth media for up to an hour and then removed. Thereafter, Vero cells or Calu-3 lung epithelial cells were immersed in the cell growth media and incubated overnight in a $CO_2$ incubator. Cell viability was determined by assessing ATP production using a luminescence assy. The luminescence assay did not reveal a substantial change in cell viability.

Efficacy. Efficacy of the fabric against a panel of bacterial and viral pathogens was tested. The panel included gram-positive, gram-negative, and antibiotic-resistant bacteria, bacteriophages as representatives of non-enveloped viruses, enveloped viruses such as H1N1 flu, H3N2 flu, and SARS-CoV-2, and non-enveloped viruses such as feline calicivirus. In all cases, >99% kill rates were observed within 30 seconds, and full efficacy was maintained over 15 days of repeated daily exposure. The efficacy was >99.9% over a standard EPA exposure time of 2 hours against *Staphylococcus aureus* (ATCC 6538), *Enterobacter aerogenes* (ATCC 13048), *Pseudomonas aeruginosa* (ATCC 15442), Methicillin Resistant *Staphylococcus aureus* MRSA (ATCC 33592), and *Escherichia coli* O157:H7 (ATCC 35150). The fabric maintained substantially 100% of the original efficacy against repeated viral inoculations (27M PFUs; H1N1, H3N2 and feline calicivirus) or bacterial loads introduced to the fabric over the course of 30 days. The fabric maintained >99.9% efficacy against *Staphylococcus aureus* and *Klebsiella aerogenes* after months of daily high-touch use and moisture exposure with visible wear. An inactivation rate of substantially 100% was realized against human wound pathogens such as *Acinetobacter baumannii, Klebsiella pneumonia, Pseudomonas aeruginosa, Enterococcus faecalis*, Methicillin-resistant *Staphylococcus aureus* (MRSA), and *Staphylococcus epidermidis* over 24 hours.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the features of the present disclosure are presented herein. Not all features of a physical implementation are described or shown in this application for the sake of clarity. It is understood that in the development of a physical embodiment incorporating the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The disclosure herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method for producing an air filtration medium exhibiting biocidal activity, the method comprising the steps of:
   providing an air filtration medium comprising a plurality of fibers;
   providing a sprayable formulation, wherein the sprayable formulation comprises a plurality of metal nanoparticle agglomerates and an additive for producing reactive oxygen species dispersed in an organic matrix comprising one or more organic solvents, the plurality of metal nanoparticle agglomerates comprising a plurality of metal nanoparticles having a surfactant coating thereon when applied to the plurality of fibers; and
   spraying the sprayable formulation comprising the plurality of metal nanoparticles and the additive for producing reactive oxygen species onto the air filtration medium to adhere the plurality of metal nanoparticle agglomerates to the plurality of fibers;

wherein the plurality of metal nanoparticle agglomerates comprise a plurality of fused, partially fused, and/or unfused metal nanoparticles that are associated with one another upon a surface of the plurality of fibers.

2. The method of claim 1, wherein the metal nanoparticles within the metal nanoparticle agglomerates comprise copper nanoparticles, silver nanoparticles, or any combination thereof.

3. The method of claim 1, further comprising:

removing the surfactant coating from the plurality of metal nanoparticles, such that the plurality of metal nanoparticle agglomerates become adhered to the plurality of fibers;

wherein removing the surfactant coating comprises heating the air filtration medium to a temperature of about 30° C. to about 65° C. in flowing oxygen or air after adhering the plurality of metal nanoparticle agglomerates to the plurality of fibers.

4. The method of claim 1, wherein at least a majority of the metal nanoparticles within the metal nanoparticle agglomerates range from about 50 nm to about 250 nm in size.

5. The method of claim 1, wherein at least a majority of the metal nanoparticles in the metal nanoparticle agglomerates are unfused with one another.

6. The method of claim 1, further comprising:

applying an adhesive layer to the air filtration medium, wherein the adhesive layer has a thickness of about 300 nm or less, wherein the sprayable formulation is adhered to the adhesive layer.

7. The method of claim 1, wherein at least a majority of the metal nanoparticles in the metal nanoparticle agglomerates are unfused with one another.

8. The method of claim 1, wherein the plurality of metal nanoparticle agglomerates are adhered to the plurality of fibers via an adhesive layer, wherein the adhesive layer has a thickness of about 300 nm or less.

9. The method of claim 8, wherein the adhesive layer slows the production of oxidized metal species, thereby providing a time release profile of active metal from the metal nanoparticle agglomerates.

10. The method of claim 1, wherein the sprayable formulation exhibits a viscosity of about 1 cP to about 100 cP.

11. The method of claim 1, wherein metal nanoparticle loadings within the sprayable formulation are within the range of about 1 wt. % to about 35 wt. %.

12. The method of claim 1, wherein the sprayable formulation further comprises an aerosol propellant.

13. A method comprising:

providing an air filtration medium exhibiting biocidal activity made by the method of claim 1;

passing an air flow through the air filtration medium, the air flow having a pathogenic load before passing through the air filtration medium; and decreasing the pathogenic load, inactivating or killing one or more pathogens, or any combination thereof upon passing the air flow through the air filtration medium.

14. The method of claim 13, wherein the metal nanoparticles within the metal nanoparticle agglomerates comprise copper nanoparticles, silver nanoparticles, or any combination thereof.

15. The method of claim 13, wherein at least a majority of the metal nanoparticles within the metal nanoparticle agglomerates range from about 50 nm to about 250 nm in size.

16. The method of claim 13, wherein the air filtration medium changes color when the biocidal activity of the metal nanoparticles adhered to the air filtration medium changes.

* * * * *